US007490113B2

United States Patent
Bourbonnais et al.

(10) Patent No.: US 7,490,113 B2
(45) Date of Patent: Feb. 10, 2009

(54) DATABASE LOG CAPTURE THAT PUBLISHES TRANSACTIONS TO MULTIPLE TARGETS TO HANDLE UNAVAILABLE TARGETS BY SEPARATING THE PUBLISHING OF SUBSCRIPTIONS AND SUBSEQUENTLY RECOMBINING THE PUBLISHING

(75) Inventors: Serge Bourbonnais, Palo Alto, CA (US); Siquan Li, San Jose, CA (US); Bruce Gilbert Lindsay, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1275 days.

(21) Appl. No.: 10/650,353

(22) Filed: Aug. 27, 2003

(65) Prior Publication Data

US 2005/0049945 A1    Mar. 3, 2005

(51) Int. Cl.
*G06F 17/30* (2006.01)
(52) U.S. Cl. .................. 707/202; 707/8; 707/100
(58) Field of Classification Search ............... 707/100, 707/200, 201–204, 8
See application file for complete search history.

(56) References Cited

U.S. PATENT DOCUMENTS

| | | | |
|---|---|---|---|
| 5,440,727 A | 8/1995 | Bhide et al. .................. 395/444 |
| 5,995,980 A | 11/1999 | Olson et al. .................. 707/201 |
| 6,029,178 A | 2/2000 | Martin et al. ................ 707/201 |
| 6,178,427 B1 | 1/2001 | Parker .......................... 707/202 |
| 6,192,365 B1 | 2/2001 | Draper et al. ................. 707/101 |
| 6,199,074 B1 | 3/2001 | Kern et al. .................... 707/204 |
| 6,205,499 B1 | 3/2001 | Houlberg et al. ............... 710/68 |
| 6,256,664 B1 * | 7/2001 | Donoho et al. ............... 709/204 |
| 6,289,357 B1 | 9/2001 | Parker .......................... 707/202 |
| 6,356,936 B1 * | 3/2002 | Donoho et al. ............... 709/206 |
| 6,401,120 B1 | 6/2002 | Gamache et al. ............. 709/226 |
| 6,408,310 B1 | 6/2002 | Hart ............................. 707/201 |
| 6,430,577 B1 | 8/2002 | Hart ............................. 707/201 |
| 6,519,614 B1 | 2/2003 | Kanai et al. ................... 707/202 |

(Continued)

FOREIGN PATENT DOCUMENTS

WO    WO 03/001382    1/2003

(Continued)

OTHER PUBLICATIONS

Sinn et al., U.S. Appl. No. 09/567,958, filed May 9, 2000, "Remote log based replication solution", assignee International Business Machines Corporation, IBM.

*Primary Examiner*—Cheryl Lewis
(74) *Attorney, Agent, or Firm*—Janet M. Skafar; Gregory M. Plow; Ingrid M. Foerster

(57) ABSTRACT

A first log reader publishes first messages to a plurality of queues. The first messages comprise changes for transactions extracted from a log by the first log reader. In response to one of the queues becoming unavailable, launching a second log reader to read and extract from the log, and to publish second messages comprising changes for transactions extracted from the log by the second log reader to the unavailable queue as a catch-up queue. In response to the catch-up queue becoming available and the second log reader reaches the end of the log, the publishing of the second messages for the catch-up queue is transferred from the second log reader to the first log reader.

10 Claims, 17 Drawing Sheets

Startup for a mainline log reader and at least one catch-up log reader

U.S. PATENT DOCUMENTS

| | | | | |
|---|---|---|---|---|
| 6,604,130 B2 * | 8/2003 | Donoho et al. | ............... | 709/204 |
| 6,801,929 B1 * | 10/2004 | Donoho et al. | ............... | 709/204 |
| 6,931,434 B1 * | 8/2005 | Donoho et al. | ............... | 709/207 |
| 7,197,534 B2 * | 3/2007 | Donoho et al. | ............... | 709/204 |
| 7,246,150 B1 * | 7/2007 | Donoho et al. | ............... | 709/204 |
| 7,277,919 B1 * | 10/2007 | Donoho et al. | ............... | 709/206 |
| 7,346,655 B2 * | 3/2008 | Donoho et al. | ............... | 709/204 |
| 2002/0133507 A1 | 9/2002 | Holenstein et al. | .......... | 707/200 |
| 2003/0014523 A1 | 1/2003 | Teloh et al. | ................. | 709/226 |

FOREIGN PATENT DOCUMENTS

| | | |
|---|---|---|
| WO | WO 03/001382 A1 | 1/2003 |

* cited by examiner

Startup for a mainline log reader and at least one catch-up log reader

Mainline Log Reader

Mainline Log Reader

Queue in Error
Mainline Log Reader

Mainline Log Reader

Catch-up Log Reader

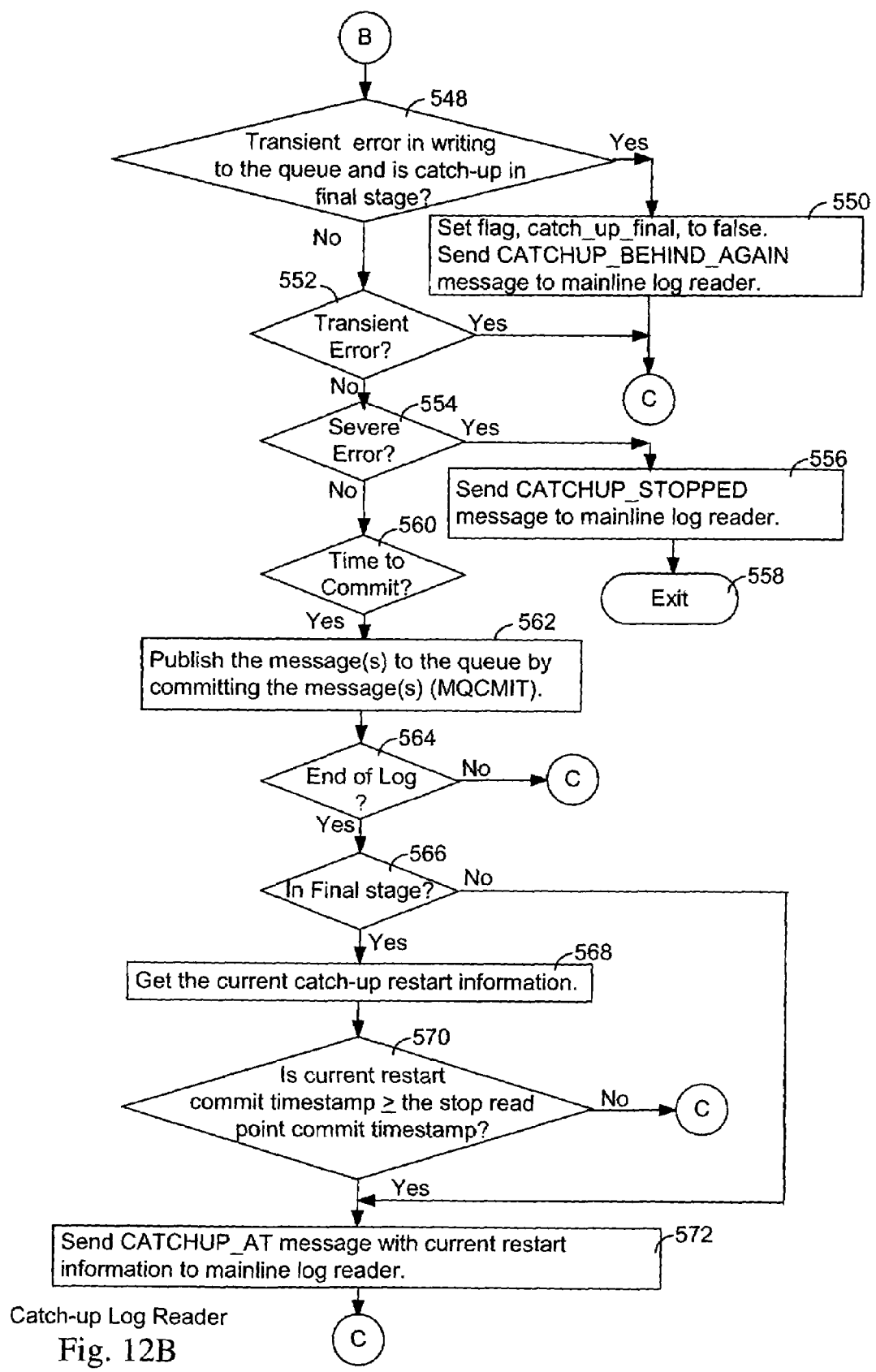
Fig. 12B Catch-up Log Reader

DATABASE LOG CAPTURE THAT PUBLISHES TRANSACTIONS TO MULTIPLE TARGETS TO HANDLE UNAVAILABLE TARGETS BY SEPARATING THE PUBLISHING OF SUBSCRIPTIONS AND SUBSEQUENTLY RECOMBINING THE PUBLISHING

BACKGROUND OF THE INVENTION

1. Field of the Invention

The invention relates to a technique for a log capture program in a database management system. In particular, this technique is for database replication using a log capture program that publishes transactions to multiple targets and handles unavailable targets by separating the publishing of subscriptions from a mainline log reader and subsequently transferring the publishing back to the mainline log reader. This technique is particularly, though not exclusively, suited for use with a database management system.

2. Description of Related Art

Database management systems allow large volumes of data to be stored and accessed efficiently and conveniently in a computer system. In a database management system, data is stored in database tables which effectively organize the data into rows and columns. A database engine responds to user commands to store and access the data.

In FIG. 1, a database table 20 having rows 22 and columns 24 is shown. A row 22 has one or more columns 24. A row 22 is also referred to as a database record.

Data replication refers to maintaining duplicate sets of data. A source database, or portions thereof, may be replicated on one or more target databases. Some users mirror their data in a target database at a single location, while other users replicate all or portions of their data in target databases at different locations. By replicating data in target databases, some users can continue to access their target databases even though the source database or other target databases may be unavailable. In addition, having replicated data on multiple target computers reduces the processing load at the source computer because a user can access the data on a target computer.

The database management system maintains a log to record transactions for recovery. This log is referred to as the source database log. The log contains records for each change to the database and for commit and rollback. The database uses a write-ahead logging protocol (WAL) under which changes made by applications are first logged in the log before being written to disk. In the case of a crash, the database management system will replay the log records to restore the database to a consistent state. For each change log record, there is a matching rollback or commit record. The commit record marks the end of a series of change records in the log for a transaction that was successfully committed to the database. The rollback record marks the end of a transaction that was not completed (aborted) by the user.

In one replication system, a registration is specified to indicate which changes from the log are to be captured into a staging area, and then a subscription indicates which changes will be extracted from the staging area and sent to a target database. In one embodiment, the subscriptions are stored in one or more database tables in the source database. Each target database is associated with a queue to which the subscribed changes for that target database are written. The subscription identifies a database table and the queue to which the subscribed changes to that table should be written. The subscription allows a user to subscribe to all or a subset of the columns of a table. For example, one user may want to replicate only the name and address when the address is changed, rather than an entire employee record on one target database. The subscription may also specify a predicate for filtering changes, such as replicate only employees "where state='CA'". In an exemplary subscription below, when the table ORDERS is updated, the columns called custid and amount are sent to the queue called PURCHASESQ when the state is equal to "CA."

--- subscription: S1
table name: ORDERS
queue: PURCHASESQ
columns: custid, amount
predicate: "Where state='CA'"

---

The replication technique may impact the performance of the database management system and the applications that access the database. For example, some replication techniques are based on pre-defined triggers. The triggers are fired when applications update the database. In another technique, the applications use a two-phase commit to save the changes to both the source and replica database in the same transaction. These techniques introduce a fixed overhead for each transaction, degrade the overall throughput, and are not scalable to multiple targets.

Another technique, referred to as log capture based replication, has much less impact than the aforementioned techniques. In log capture based replication, a capture program, also referred to as a log reader, reads the source database log and sends transactions to a staging area for a target database in accordance with the subscription. The capture program operates asynchronously with respect to applications that may be updating the database tables. One advantage to log capture based replication is that changes to the database can be captured and replicated without impacting the applications that are using the database. This is particularly true when the log can be captured using dedicated processors and input/output subsystems, such as when the log is physically mirrored on separate hardware.

In one technique, the staging area may be implemented as a set of relational database tables. Alternately, the staging area may be implemented as a queue. Directly writing the captured changes to a queue is faster than using database tables. In some replication schemes, each target database is associated with a queue and a reader, typically referred to as an Apply program. The Apply program reads the transactions from the queue and applies the transactions to the tables of the target database.

A transaction is a sequence of updates, inserts and deletes followed by a commit. In the context of a table, the term "change" refers to an update, an insert or a delete. Given that a user subscribes to changes to tables, the transactions published on the queue may be a subset of all the transactions performed in the original system. Furthermore, the transactions published on the queue may contain a subset of all the changes making up a transaction. In addition, a particular change for a table for which there is a subscription may not be published to a queue depending on the subscription predicates. For example, assume that a database has three tables—ORDERS, ACCOUNT and BILLING. The database has two subscriptions, one to table ORDERS and another to table ACCOUNT. The following transaction is performed against the database:

```
INSERT into ORDERS (custid, amount) values (5000, 19.99);
UPDATE ACCOUNT set balance = 19.99 where custid=5000;
INSERT into BILLING values (5000, 19.99, itemno);
COMMIT;
```

The capture program will publish only a portion of the above transaction. The portion of the transaction published by the capture program will contain the changes, the insert and the update, to the ORDERS and ACCOUNT tables, but not the insert to the BILLING table.

A problem arises when a queue becomes unavailable. For example, a queue may fail, the queue or its associated target computer may be taken offline by an administrator, or the queue may fill up because its queue reader, its Apply program, is not retrieving transactions fast enough. One solution is to stop the capture program until the unavailable queue becomes available. However, readers for other queues may continue to be available and operational. Stopping the capture program penalizes those readers and target databases that are still available. If the available queue readers are maintaining target database replicas, those target database replicas would be lagging further behind the source database where changes may still be taking place. One unavailable queue should not penalize all target databases. Therefore, a technique is needed to allow the capture program to continue publishing transactions to available queues when one or more queues becomes unavailable and to resume publishing when a queue becomes available.

SUMMARY OF THE INVENTION

To overcome the limitations in the prior art described above, and to overcome other limitations that will become apparent upon reading and understanding the present specification, various embodiments of a method of log capture are disclosed. In some embodiments, a first log reader publishes first messages to a plurality of queues. The messages comprise changes for transactions extracted from a log by the first log reader. In response to one of the queues becoming unavailable, a second log reader is launched to read and extract from the log, and to publish second messages comprising changes for transactions extracted from the log by the second log reader to the unavailable queue as a catch-up queue. In response to the catch-up queue becoming available and the second log reader reaching the end of the log, the publishing of the second messages for the catch-up queue is transferred from the second log reader to the first log reader.

In this way, the mainline log reader can continue publishing to the available queues, and the available queues and associated target databases are not penalized.

BRIEF DESCRIPTION OF THE DRAWINGS

The teachings of the present invention can be readily understood by considering the following detailed description in conjunction with the accompanying drawings, in which:

FIGS. 12A, 12B and 12C collectively depict a flowchart of an embodiment of a technique that implements a catch-up log reader in accordance with the time sequence diagrams of FIGS. 9 and 10.

To facilitate understanding, identical reference numerals have been used, where possible, to designate identical elements that are common to some of the figures.

DETAILED DESCRIPTION OF THE PREFERRED EMBODIMENTS

Figure 1:
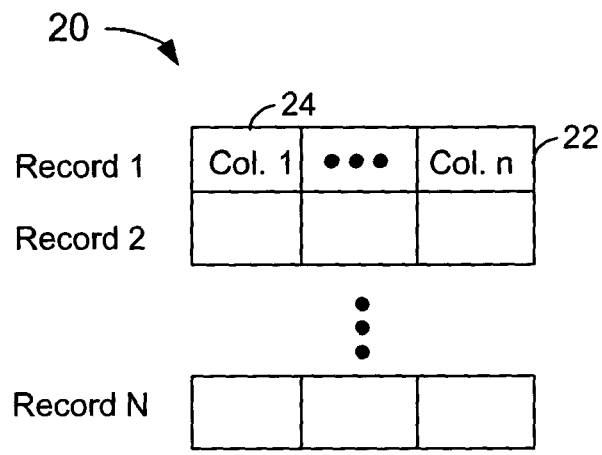
FIG. 1 depicts a database table having rows and columns.

After considering the following description, those skilled in the art will clearly realize that the teachings of the present invention can be utilized to improve performance in substantially any database management system that replicates data to several targets simultaneously. The invention may be used as a standalone program in conjunction with a database management system, or the invention may be integrated as a component into a database management system. To simplify the following discussion and facilitate reader understanding, the present invention will be described in the context of use in a database management system that executes on a mainframe computer in a client-server environment.

A technique, specifically a method, apparatus, and article of manufacture that implements the method, allows data replication to continue even when certain components become unavailable. In one embodiment of the technique, a mainline log reader publishes messages to a plurality of queues, the messages comprising transactions extracted from a log. When one of the queues becomes unavailable, a catch-up log reader is launched to read from the log and to publish the messages that comprise transactions extracted from the log to the unavailable queue. When the unavailable queue becomes available and the catch-up log reader reaches the end of the log, the publishing of the messages for the catch-up queue is transferred from the catch-up log reader to the mainline log reader. A data transaction that is published in a message may comprise all or a subset of the changes making up that transaction in the log. The technique allows a source computer system to continue to send updates to available target systems even though other target systems or associated components on the source computer may be unavailable.

An error is generated when a queue becomes unavailable. Typically, a transient error occurs when a queue fills up. However, a transient error can also occur when a storage administrator takes a queue or a target database offline.

In another embodiment, a capture program has a mainline log reader that reads transactions from a source database log, hereinafter referred to as the log, and sends changes to subscribed tables, as transaction-messages (hereinafter, also referred to as messages), to multiple message queues, hereinafter referred to as queues. The mainline log reader launches a catch-up log reader when a transient error is detected on a queue and transaction-messages cannot be sent to that queue, referred to as a catch-up queue. In this specification, the term "catch-up queue" will be used to refer to a queue that is being serviced by a catch-up log reader. The catch-up log reader reads from the log and attempts to publish messages to its associated catch-up queue, while the mainline log reader continues to publish to the remaining queues. In particular, the catch-up log reader attempts to re-publish the failed messages onto its catch-up queue, sleeping a predetermined number N of seconds between attempts. Once the catch-up queue becomes available and messages are published to the catch-up queue, the catch-up log reader continues to read from the log and publish subscribed transactions to the catch-up queue until the catch-up log reader reaches the end of the log. Upon reaching the end of the log, the catch-up log reader re-synchronizes with the mainline log reader so that the mainline log reader will resume publishing to the catch-up queue. The catch-up log reader is then terminated. While the catch-up log reader is executing, the mainline log reader re-constructs transactions in a mainline buffer for all of the queues, even for the catch-up queues, but does not publish to the catch-up queues. The catch-up log reader re-constructs transactions in a catch-up buffer only for the catch-up queue that the catch-up log reader is serving. If multiple catch-up log readers are executing, each catch-up log reader will be associated with a catch-up buffer only for the catch-up queue that the catch-up log reader is serving.

Figure 2:
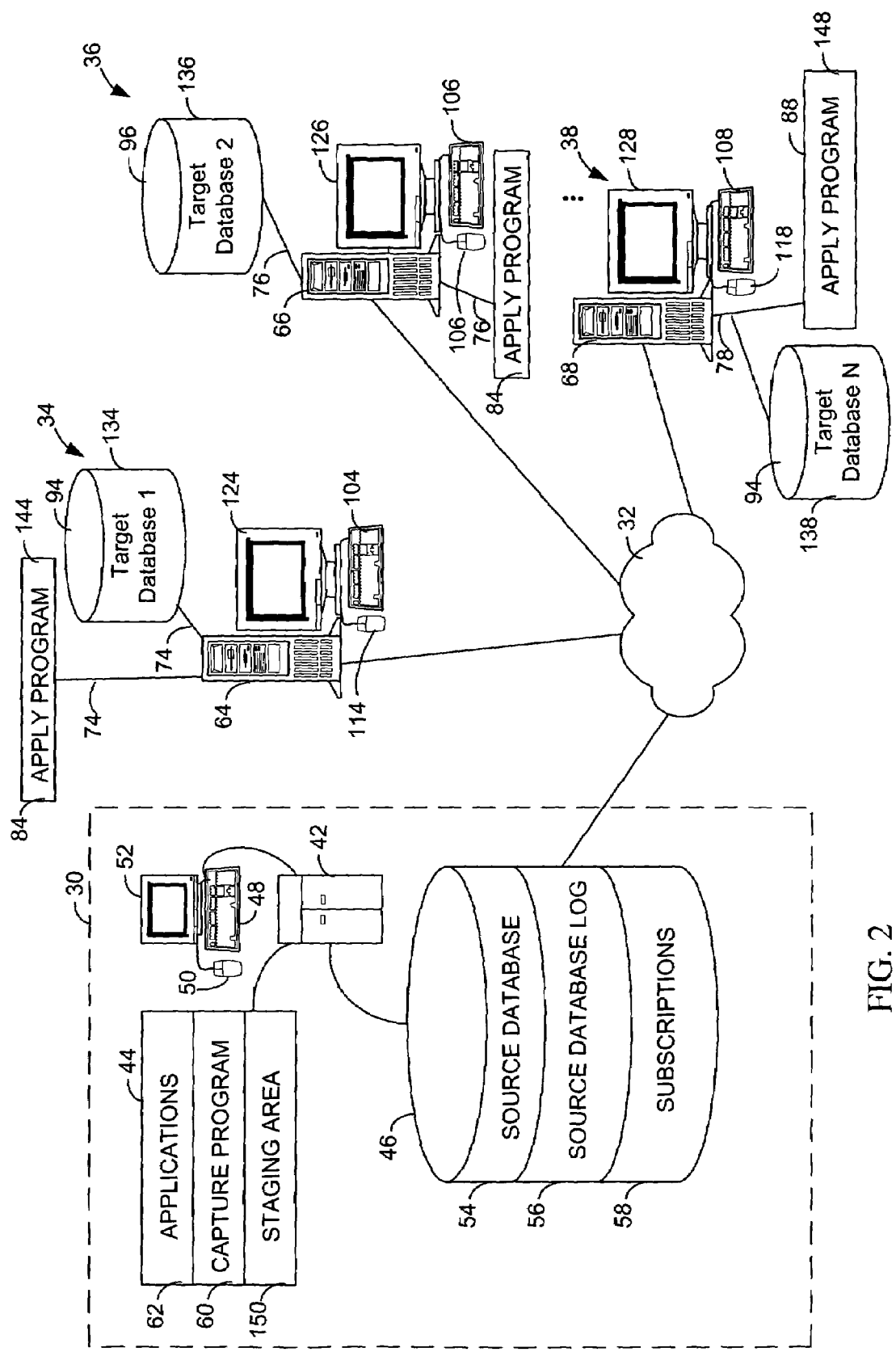
FIG. 2 depicts an exemplary source computer system with a source database, that uses the teachings of the present invention, coupled to multiple target computer systems with target databases.

Referring to FIG. 2, an exemplary network of computers suitable for utilizing the present invention is shown. A source computer 30 is coupled, via a network, 32 to multiple target computers 34, 36 and 38, 1, 2 to N, respectively. The source computer 30 has a processing unit 42 with a processor coupled to, via one or more busses, a memory 44, at least one disk drive 46, and input devices such as a keyboard 48 and mouse 50, and a display 52. The disk drives 46 store a source database 54, source database log 56, and subscriptions 58 to the table changes in the source database. In one embodiment, the memory 44 stores a Capture program 60, which when executed, reads from the source database log 56 and publishes subscribed transactions to a staging area. The memory may also store applications 62 that access the source database 54. In another embodiment, the network 32 may be the Internet.

The target computers 1 to N, 34, 36, and 38 have a processing unit 64, 66 and 68, with a processor, coupled to, via one or more busses 74, 76 and 78, a memory, 84, 86, and 88, at least one disk drive 94, 96, and 98, and input devices such as a keyboard 104, 106 and 108, and mouse 114, 116 and 118, and a display, 124, 126 and 128, respectively. The disk drives 94, 96, and 98, store target databases 134, 136 and 138, respectively. The target computers' memory 84, 86, and 88, stores an Apply program, 144, 146 and 148, which when executed, reads the subscribed transactions from a staging area 150 in the source computer 30 using the network 32, and applies the subscribed transactions to the target database, 134, 136 and 138, respectively.

Figure 3:
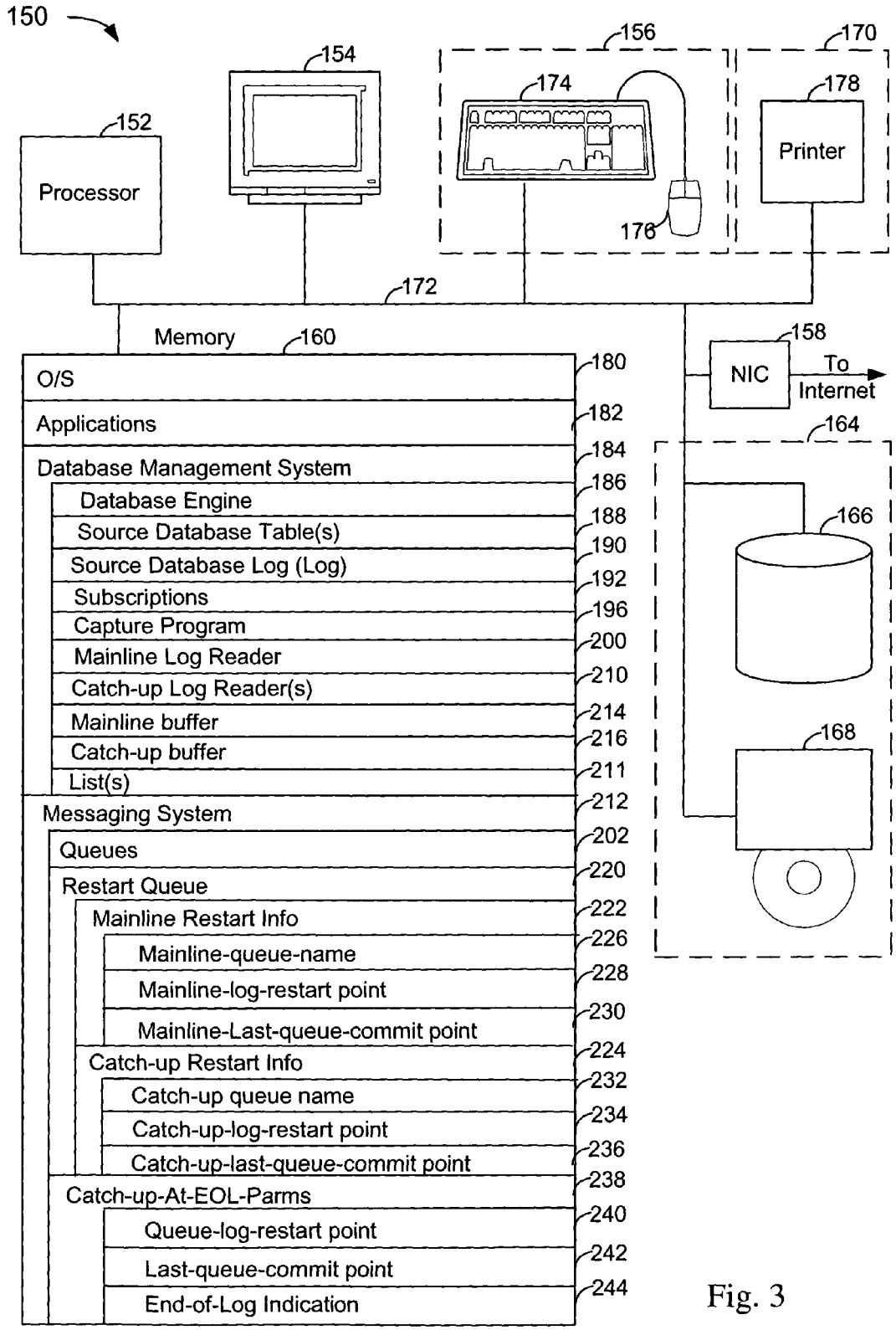
FIG. 3 depicts an illustrative source computer system that uses the teachings of the present invention.

FIG. 3 depicts an illustrative source computer system 150 that utilizes the teachings of the present invention. The computer system 150 comprises a processor 152, display 154, input interfaces (I/F) 156, communications interface 158, memory 160, disk memories 164 such as hard disk drive 166 and optical disk drive 168, and output interface(s) 170, all conventionally coupled by one or more busses 172. The input interfaces 156 comprise a keyboard 174 and mouse 176. The output interface 170 is a printer 178. The communications interface 158 is a network interface card (NIC) that allows the computer 150 to communicate via the network, such as the Internet, to target computers. Alternately, a modem may be used to communicate with a target computer.

The memory 160 generally comprises different modalities, illustratively semiconductor memory, such as random access memory (RAM), and disk drives. The memory 160 stores operating system (O/S) 180 and applications 182 that may use the database management system 184. The O/S 90 may be implemented by any conventional operating system including, and not limited to, z/OS® (Registered Trademark of International Business Machines Corporation), AIX® (Registered Trademark of International Business Machines Corporation), UNIX® (Registered trademark in the United States and other countries licensed exclusively through X/Open Company Limited), Windows® (Registered Trademark of Microsoft Corporation), and Linix® (Registered Trademark of Linus Torvalds).

The database management system 184 is a DB2® system (DB2® is a registered trademark of International Business Machines Corporation). However, the inventive technique is not meant to be limited to a DB2® database management system, and may be used with other database management systems.

In one embodiment, the specific software modules that implement the present invention are incorporated in the database management system 184. A software module may comprise one or more computer programs. In an alternate embodiment, the specific software modules that implement the present invention are provided separate from the database management system 184. The software modules are comprised of instructions which, when loaded into the memory 160, are executed by the processor 152.

A database engine 186 allows a user to execute commands to insert data into, delete data from, or search the database tables 188. In one embodiment, the commands are Structured Query Language (SQL) statements that conform to a Structured Query Language standard as published by the American National Standards Institute (ANSI) or the International Standards Organization (ISO). In alternate embodiments, languages other than SQL may be used.

Generally, the O/S, applications, database management system, messaging system, capture program and log reader software are tangibly embodied in a computer-readable medium, for example, memory 160 or, more specifically, one of the disk drives 164, and is comprised of instructions which, when executed, by the computer system 150, causes the computer system 150 to utilize the present invention.

The memory 160 stores the software modules and data. In one embodiment, the memory 160 may store a portion of the software modules and data in semiconductor memory, while other software modules and data are stored in disk memory. In some embodiments, the memory 160 stores the following:

The operating system (O/S) 180;

Applications 182;

The database management system 184;

The database engine 186 that processes SQL statements to create, read from, and write to database tables;

Source Database tables 188 for storing data;

A source database log 190 that stores a history of activity, including but not limited to transactions, in the database management system;

Subscriptions 192 to specified transactions to be published to the target databases;

A capture program 196 that, in one embodiment, starts, and in an alternate embodiment restarts, a mainline log reader 200;

A mainline log reader 200 to read the source database log 190 and publish subscribed transactions to queues 202;

Queues 202, such as message queues, that receive subscribed transactions as transaction-messages from a log reader and provide the transaction-messages to respective target computers;

One or more catch-up log readers 210 to read from the source database log and publish transactions as transaction-messages, to a respective catch-up queue based on the subscription associated with that queue; if all queues are available, no catch-up log readers will be executing;

List(s) 211 comprising any one or combination of, depending on the embodiment, a list of a catch-up log readers, a list of catch-up log readers in final stage, and a list of catch-up log readers ahead of the mainline log reader;

A messaging system 212 to provide an application messaging interface to the queues 202; in one embodiment, the messaging system is I.B.M.® WebSphere® MQ (formerly MQSeries) (Registered Trademarks of International Business Machines Corporation), however, other messaging systems may be used;

A mainline buffer 214 that stores transactions prior to sending the subscribed changes for the transactions to the queues by the mainline log reader;

A catch-up buffer 216 that stores transactions for a catch-up queue prior to sending the subscribed changes for the transaction to the catch-up queue by the catch-up log reader;

Restart queue 220 to store mainline restart information 222 for the mainline log reader and catch-up restart information 224 for the catch-up log reader;

Mainline restart information 222 comprising a mainline queue name 226, mainline-log-restart point 228 and a mainline-last-queue-commit point 230;

Catch-up restart information 224 comprising a catch-up queue name 232, a catch-up-log-restart point 234 and a catch-up-last-queue-commit point 236; and Catch-up-At-EOL-Parameters 238 comprising a catch-up-log-restart point 240, a catch-up-last-queue-commit point 242 and an end-of-log indication 244.

The present invention may be implemented as a method, apparatus, or article of manufacture using standard programming and/or engineering techniques to produce software, firmware, hardware, or any combination thereof. The term "article of manufacture" (or alternately, "computer program product") as used herein is intended to encompass a computer program accessible from any computer-readable device, carrier, or media. Those skilled in the art will recognize that many modifications may be made to this configuration without departing from the scope of the present invention.

Those skilled in the art will also recognize that the exemplary computer illustrated in FIG. 3 is not intended to limit the present invention. Indeed, those skilled in the art will recognize that other alternative hardware environments may be used without departing from the scope of the present invention.

Figure 4:
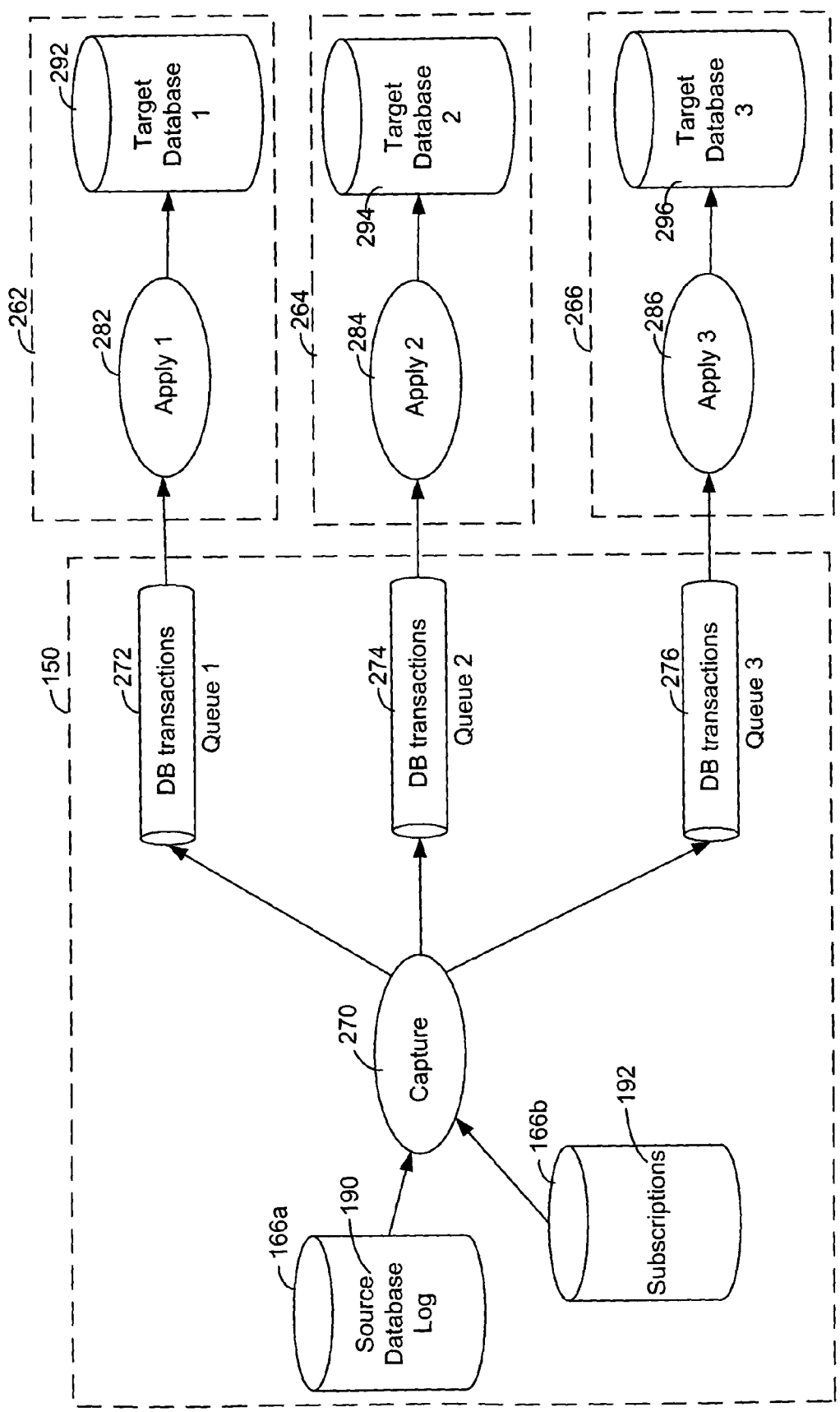
FIG. 4 depicts an illustrative source computer system, with multiple queues, coupled to multiple target computer systems.

Referring to FIG. 4, an illustrative source computer system 150, with multiple queues, is coupled to multiple target computer systems 262, 264 and 266. The source computer 150 has a source database log 190 and subscriptions 192 stored on disks 166a and 166b, respectively. A capture program 270 reads transactions from the source database log 190 and publishes subscribed changes for the transactions to the queues 272, 274 and 276 based on the subscriptions 192. Each queue 272, 274 and 276 is coupled to a target computer 262, 264 and 266, respectively. In each target computer 262, 264 and 266, an apply program 282, 284 and 286, retrieves the subscribed changes for the transactions from its associated queue 272, 274 and 276 on the source computer 150 and applies the subscribed changes to the target database 292, 294 and 296, respectively.

In the database, a SQL commit statement terminates a unit of work for the database by writing a commit record into the log to guarantee that a transaction will be recoverable even if a transaction has not been written to disk. A SQL rollback statement causes undo and rollback records to be written to the source database log 190.

In one embodiment, to interact with the messaging system, a command, referred to as message-queue-put (MQPUT), writes a message onto a queue 272, 274 and 276, for delivery. A message queue commit (MQCMIT) command commits the sending of a group of one or more messages to one or more message queues such that the messages are guaranteed to be sent. The committing of the messages to the message queues is referred to as publishing. The message-queue-commit command terminates a unit of work for the message queue. For example, a unit of work can be made up of one or more MQPUT commands followed by the MQCMIT command.

Each database transaction's subscribed changes are written as a separate message and will be referred to as a transaction-message. The transaction-message may contain all the changes making up the database transaction or a subset of the changes making up the database transaction. Ideally, the transaction-messages are sent directly from the message queue to the transmission channel when committed.

In addition, the publishing of the transaction-messages can be optimized. The capture program uses a message queue commit interval parameter to determine when to commit the messages on the queues. The end-to-end latency of the system and publishing throughput of the queues can be balanced by adjusting the message queue commit interval parameter.

Figure 5:
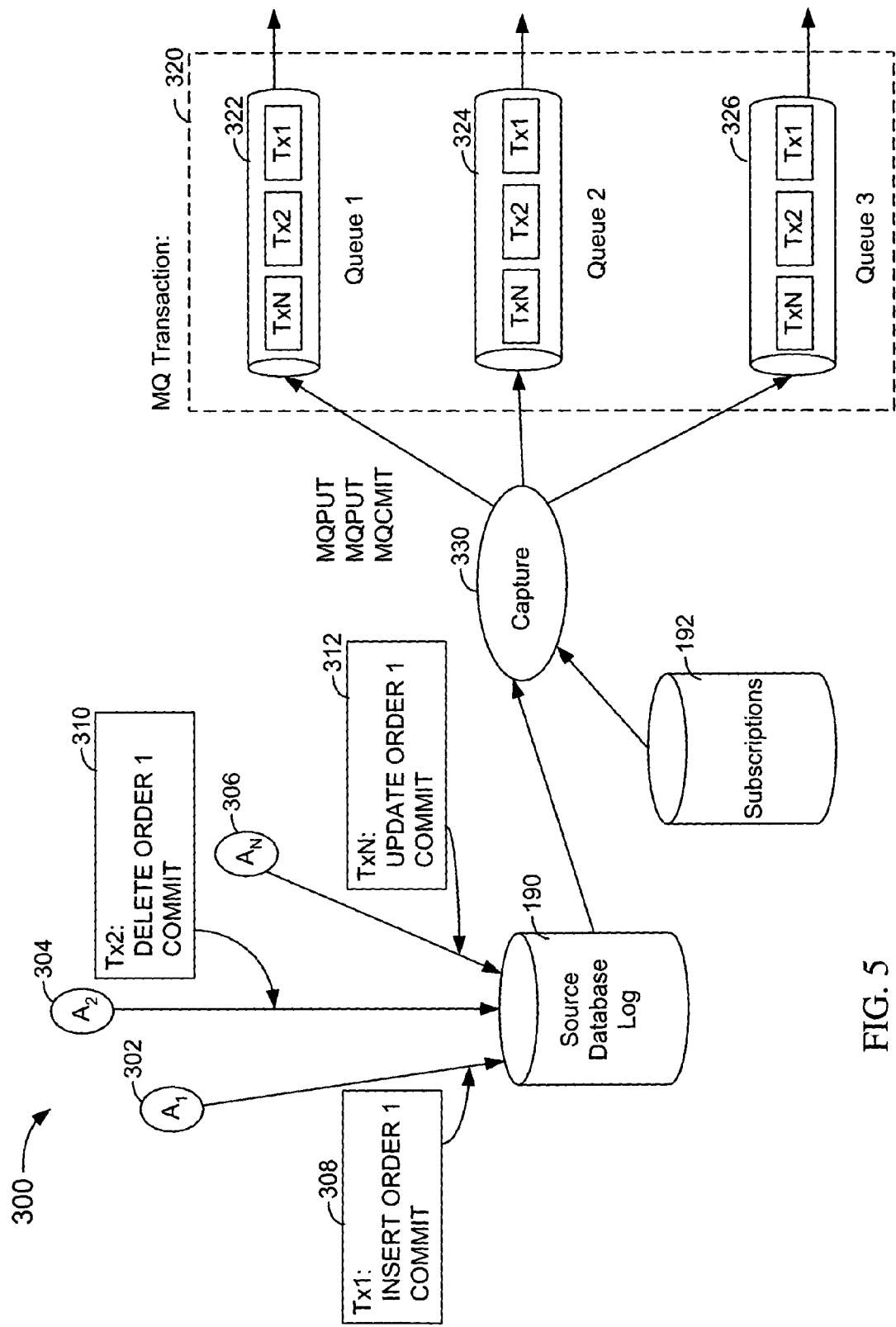
FIG. 5 depicts the publishing of several database transactions in one queuing system transaction.

Referring to FIG. 5, the publishing of several database transactions in one queuing system transaction is illustrated. Applications, $A_1$, $A_2$ to $A_N$, 302, 304 and 306, are database applications issuing transactions, Tx1, Tx2 to TxN, 308, 310, and 312, respectively, that are recorded in the source database log 190. In each transaction 302, 304 and 306, a SQL statement to either insert, delete or update a record, respectively, is followed by a SQL COMMIT statement to guarantee that the SQL statement will be performed. The target computers have three subscriptions to queues 320. Queue one 322, queue two 324 and queue three 326 all subscribe to a table called "ORDERS."

A Capture program 330 captures the changes to the ORDERS table and writes those changes as transaction-messages to the queues which subscribe to this table. After a period of time equal to the message queue commit interval has elapsed, typically a predetermined number of milliseconds, during which further changes to the ORDERS table are captured, the capture program 330 commits the messages that were written to the queues. Upon the successful completion of the message queue commit (MQCMIT) command, the messages are considered to be published to the queues 320. In FIG. 5, nine database transactions are written, as transaction-messages, to the queues, queue one 322, queue two 324 and queue three 326, at once, at one message queue commit interval. For example, in one unit of work, the capture program 330 publishes the following database transactions, as transaction-messages, to the message queues:

```
MQPUT(Tx1, Q1)
MQPUT(Tx1, Q2)
MQPUT(Tx1, Q3)
MQPUT(Tx2, Q1)
MQPUT(Tx2, Q2)
MQPUT(Tx2, Q3)
MQPUT(TxN, Q1)
MQPUT(TxN, Q2)
MQPUT(TxN, Q3)
... (after the commit interval has elapsed)
MQCMIT
```

Figure 6:
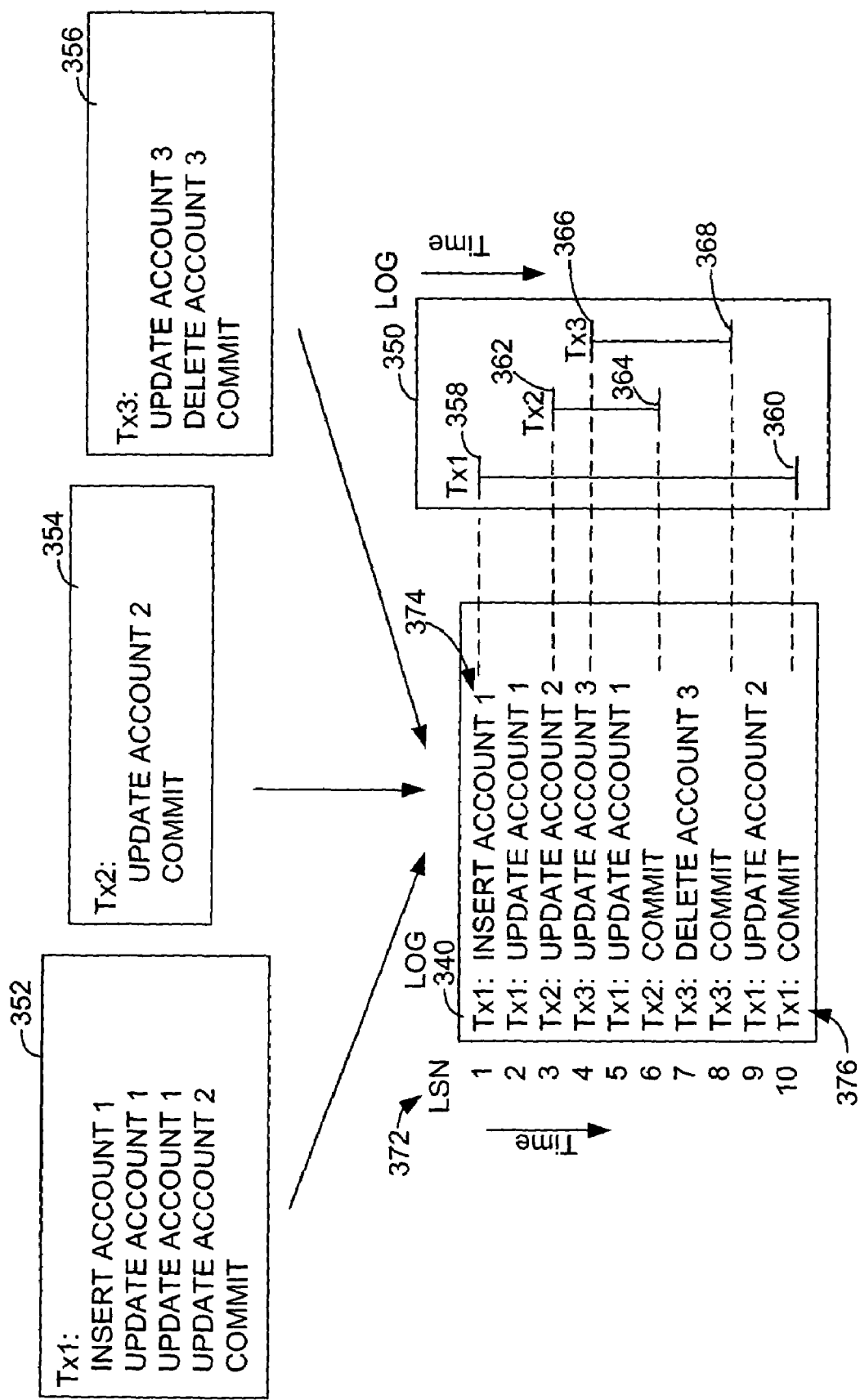
FIG. 6 depicts the state of the log given three exemplary transactions.

FIG. 6 illustrates the formation of an exemplary log 340 and depicts, in a log transaction diagram 350, the overlapping of transactions in the source database log, also referred to as the log. As shown in block 352, transaction one has SQL statements to insert and update account one and is ended by a database commit. As shown in block 354, transaction two has a SQL statement to update account two and is ended by a database commit. As shown in block 356, transaction 3 has SQL statements to update and delete account three and is ended by a database commit. As each SQL statement occurs, that SQL statement is recorded in the log. Transactions one, two and three overlap, in time, in the log 340. The log transaction diagram 350 illustrates the start and end points of each transaction in the log. Transaction one has the earliest start point 358 and the last end point 360. Transaction two has a start point 362 after transaction one and an end point 364 prior to the end of transaction three. Transaction three has a start point 366 after the start point of transaction two and has an end point 368 prior to the end point of transaction one.

In the log 340, a transaction has at least one SQL change log record and a commit record. Each log record, including the database commit, is associated with a log sequence number (LSN) 372. The log sequence number 372 is an integer value that is assigned to a log record 374 as the record is written to the log. The log sequence number 372 monotonically increments for each record 374. Each log record that changes the data in a table contains a transaction identifier 376. The log records marking the end of a transaction, that is, the rollback and commit log records, contain a transaction identifier 376 and a timestamp indicating when the database commit was performed.

Figure 7:
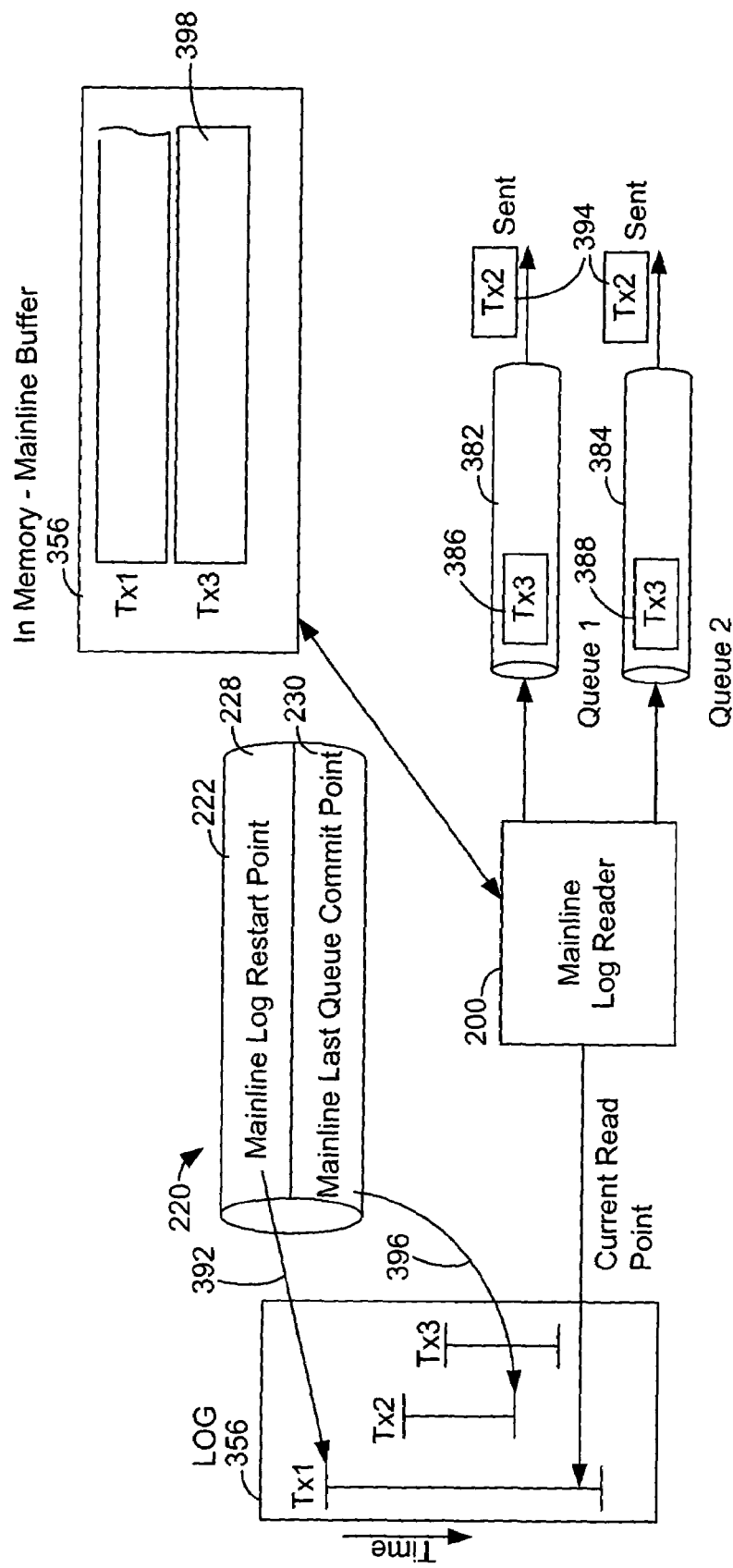
FIG. 7 depicts the operation of an exemplary mainline log reader showing the information used to restart after it has been stopped, and the transactions extracted and re-constructed in the memory of the log reader for the log of FIG. 6.

Referring to FIG. 7, a block diagram illustrates another embodiment of a log-capture transaction publishing technique. In this embodiment, the log capture program has a mainline log reader 200. Alternately, the log capture program is the mainline log reader 200. The log capture program, that is the mainline log reader 200, can be stopped and restarted, such that publishing resumes from where, or close to where, the mainline log reader 200 was reading the log 350 when the capture program was stopped.

To provide stop and restart capability, mainline-log-restart information 222 is stored on a persistent medium. The mainline-log-restart information 222 has a mainline-log-restart point 228 and a mainline-last queue commit point 230. A message is considered to be published when a message queue commit (MQCMIT) is successfully performed. The mainline-log-restart point 228 refers to a location in the log 350 associated with the start of the oldest non-published transaction, and, upon restart, the mainline log reader 200 restarts reading the log 350 from the mainline-log-restart point 228 (arrow 372). The mainline-log-restart point 228 is a log sequence number.

The mainline-last queue commit point 230 refers to a database commit timestamp associated with the most recent transaction that was successfully published to the queues 382 and 384. The mainline-last queue commit point 230 is used to avoid re-publishing transactions that have already been published. The mainline-last queue commit point 230 is a timestamp. Alternately, the mainline-last queue commit point 230 may be a log sequence number.

The term "re-constructs" refers to reading a record making up a transaction, such as a SQL statement, from the log and storing that record in a buffer in memory with other log records associated with that same transaction. The mainline log reader 200 re-constructs transactions using the transaction identifier that is associated with each log record. The mainline log reader 200 reconstructs the transactions that it extracts from the log in the mainline buffer 214 in memory. After the mainline log reader 200 reads a database commit record for a transaction, the mainline log reader 200 writes the subscribed changes for the transaction as a transaction-message, 386 and 388, to the appropriate queue(s) 382 and 384, respectively, using the MQPUT command. However, if the mainline log reader 200 encounters a rolled back database transaction, the mainline log reader 200 empties that transaction from the mainline buffer 214.

In FIG. 7, the mainline-log-restart point 228 refers to the beginning of transaction one, as indicated by arrow 392, which is the oldest non-published transaction. The mainline log reader 200 has published transaction two (Tx2) 394 to the queues. In other words, the mainline log reader 200 has issued a message-queue commit so that transaction two 394 is guaranteed to be delivered by the queuing system. The mainline log reader 200 has also updated the mainline last-queue-commit point 230 to point to the end of transaction two, as indicated by arrow 396. The mainline log reader 200 has been reconstructing transaction three 398 in the mainline buffer 214. The mainline log reader reads a database commit statement from the log 350 for transaction three (Tx3) and re-writes transaction three as transaction-messages, 386 and 388, to both queues one and two, 384 and 384, respectively. The mainline log reader 200 proceeds to read the remainder of transaction one from the log 350.

If the mainline log reader 200 were to be stopped and restarted at this point, transaction three would be rolled back from the queues. Transactions one and three would be cleared from the mainline buffer 214.

When the mainline log reader 200 restarts reading the log 350, the mainline log reader 200 retrieves the mainline-log-restart point 228, which points to the start of transaction one. The mainline log reader 200 re-reads the log starting with transaction one, and will re-construct transactions one, two and three in the mainline buffer 214. When the mainline log reader 200 reads the database commit for transaction two, the mainline log reader 200 compares the timestamp of the database commit for transaction two to the timestamp of the mainline-last queue commit point 230. Because the timestamp for transaction two is less than or equal to the mainline last queue commit point 230, transaction two is not re-written to the queues 382, 384 and is deleted from the mainline buffer 214. When the mainline log reader 200 reads the commit for transaction three from the log, the mainline log reader 200 compares the timestamp associated with the database commit for transaction three to the mainline last queue commit point 230 timestamp. Because the mainline last queue commit point 230 was prior to the database commit point for transaction three, the mainline log reader 200 re-writes transaction three 386 and 388 to the queues 382 and 384, respectively. When it comes time to commit to the queuing system, the mainline log reader 200 deletes transaction three from the mainline buffer 214 and updates the mainline last queue commit point 230 to store the value of the timestamp associated with the database commit for transaction three in the mainline restart information in the restart queue.

Publishing is performed using synchronization points to guarantee that messages are delivered once. The publishing to the queues 382 and 384 is also synchronized with the storing of the mainline restart information 222 in persistent memory. In one embodiment, a local restart queue 220, stored in persistent memory such as a disk, stores the mainline restart information 222. The mainline log reader 200 stores the restart information in the local queue in the same queuing system unit of work that is used to publish the messages containing the transactions. Using a local restart queue 220, stored in persistent memory, avoids a two-phase commit that would otherwise be needed, if the restart information were stored in a database table.

To store the restart information, a restart information message is written to the restart queue 220 in the same queuing system unit of work as the publishing of the messages containing the database transactions. For example, the messages being written to a queue may appear as follows:

```
MQPUT(transaction 1, Q1);
MQPUT(transaction 1, Q2);
MQPUT(transaction 2, Q1);
...
MQPUT(mainlineRestartInfo, localRestartQ);
MQCMIT( );
```

The MQPUT(mainlineRestartInfo, localRestartQ) statement writes the mainline restart information (mainlineRestartInfo) to the local restart queue (localRestartQ) 220. The message queue commit statement (MQCMIT) guarantees that the messages will be delivered and that the restart information becomes persistent.

Figure 8:
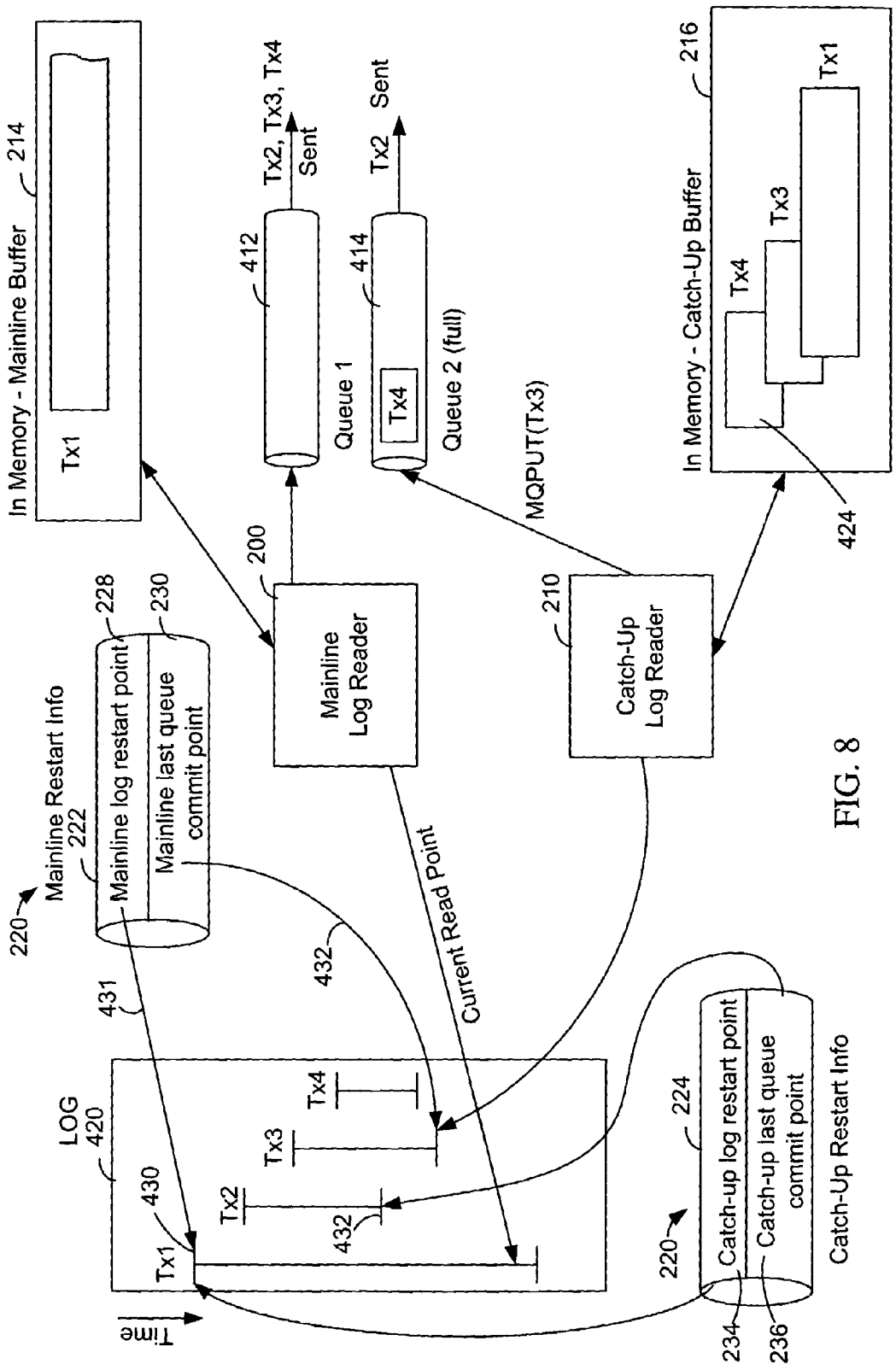
FIG. 8 depicts an embodiment of the components of a replication system having a catch-up log reader that was launched by a mainline log reader.

FIG. 8 illustrates an embodiment of a replication system that implements a catch-up log reader 210. In this embodiment, the mainline log reader 200 publishes to the queues 412 and 414, and launches a catch-up log reader 210 when a transient error is detected on a queue 414, that is, when the queue 414 becomes unavailable. The catch-up log reader 210 attempts to re-publish the messages onto the unavailable queue, the catch-up queue 414, and sleeps a predetermined number of seconds (N) between re-publishing attempts. Once the re-publishing succeeds, and the catch-up queue 414 becomes available, the catch-up log reader 210 attempts to read to the end of the log 420. When the catch-up log reader 210 reaches the end of the log 420, the catch-up log reader 210 re-synchronizes with the mainline log reader 200, and the mainline log reader 200 resumes publishing to the catch-up queue 414. The catch-up log reader 210 is then terminated.

During catch-up, the mainline log reader 200 re-constructs transactions for all queues in the mainline buffer 214, even for any catch-up queues, but does not publish transactions to the catch-up queue(s) 414. The catch-up log reader 210 re-constructs transactions in the catch-up buffer 216 for the catch-up queue 414 that it is servicing.

In one embodiment, the catch-up log reader 210 is implemented as a separate thread from the mainline log reader 200. Alternately, the catch-up log reader 210 may be implemented as a separate process from the mainline log reader 200.

When the mainline log reader 200 launches a catch-up log reader 210, the mainline log reader 200 discards any transactions that are stored in the mainline buffer 214, begins reading the log 420 at the mainline-log-restart point 228 of the mainline restart information 222, and re-constructs the transactions 422 with the subscribed changes, that are extracted from the log 420, in the mainline buffer 214. The mainline log reader 200 also invokes a messaging system function to rollback the messages on all the queues 412 and 414. The mainline log reader 200 then rewrites the rolled-back transactions to the available queue(s) 412. The mainline log reader 200 does not attempt to write to a catch-up queue 414. The catch-up log reader 210 is dedicated to attempting to publish to a single catch-up queue 414.

When a catch-up log reader 210 is launched, its catch-up restart information 224 is the same as the mainline restart information 222. The restart queue 220 stores a restart message containing the mainline restart information 222 for the mainline log reader and a restart message containing the catch-up restart information 224 for each catch-up log reader 210. Each restart message is associated with a queue name 226 and 232. The restart message for the mainline log reader has a blank queue name. To retrieve the restart information 222 and 224, the log reader 200 and 210 executes a messaging system command. For example, in one embodiment, the mainline log reader 200 will execute the following command to retrieve the mainline restart information 222 from the local restart queue 220:

MQGET(mainlineRestartInfo,NULL).

Since the catch-up log reader 210 begins to read the log 420 at last restart point 234 that was saved by the mainline log reader 200, the catch-up log reader 210 will re-construct transactions 424 in the catch-up buffer 216, and attempt to write the transactions 424 from the catch-up buffer 216 to the catch-up queue 414. For example, in FIG. 8, transaction four 424 will be rewritten to queue two 414 by the catch-up log reader 210.

In one embodiment, the mainline log reader 200 launches a catch-up log reader 210 whenever a queue becomes unavailable. Therefore, each catch-up queue 414 is associated with its own catch-up log reader 210. Each catch-up log reader 210 is also associated with its own catch-up buffer 216. Thus, if there are N catch-up queues, N catch-up log readers will be executing with N catch-up buffers.

In FIG. 8, the transactions in the log 420 contain subscribed changes that are published to both queue one 412 and queue two 414. A transient error was detected by the mainline log reader 200 on queue two when transaction three (Tx3) was attempted to be written to queue two 414 by an MQPUT(Tx3) command. When the transient error was detected, transaction two (Tx2) had been successfully committed to queues one and two, 412 and 414, respectively, and transaction four had been written to queue one 412 and queue two 414. The mainline restart information 222 had been updated in the restart queue. In the mainline restart information 222, the mainline-log-restart point 228 is the log sequence number associated with the start of transaction one (Tx1) 430, and the last queue commit point is a timestamp having a value associated with the end of transaction two (Tx2) 432.

After detecting the error when attempting to write transaction three (MQPUT(Tx3)), the mainline log reader 200 rolled-back the queuing system, where it had successfully written, but not yet committed, transaction four (Tx4) to both queue one 412 and queue two 414. The mainline log reader 200 launched a catch-up log reader 210 for queue two 414. When launching a catch-up log reader 210, the mainline log reader passes the values of the mainline restart information 222 as parameters to the catch-up log reader 210 to provide catch-up restart information. In this example, the catch-up log reader 210 starts reading the log 420 at the beginning of transaction one 430, based on the value of the mainline-log-restart point that was passed. The catch-up log reader 210 starts to re-construct transactions one, two, three and four in the catch-up buffer 216. The database commit of transaction two is read, but transaction two is not published because the catch-up log reader 210 determined that the timestamp of the database commit for transaction two is less than or equal to the timestamp of the catch-up last queue commit point which was passed as catch-up restart information. Therefore, the catch-up log reader 210 deletes transaction two from the catch-up buffer 216. The database commit timestamp from the commit log record for transaction four is read. The catch-up log reader 210 determined that the timestamp associated with the database commit for transaction four has a value greater than the timestamp of the catch-up last queue commit point that was passed to the catch-up log reader 210. Therefore the catch-up log reader 210 writes transaction four to queue two 414. The catch-up log reader then attempts to write transaction three (Tx3) to queue two 414, but queue two 414 is full. The catch-up restart information 224 in the local restart queue for the catch-up log reader 210 for queue two 414 will not be updated until the catch-up log reader 210 successfully publishes transaction four (Tx4).

Meanwhile, the mainline log reader 200 has moved forward in reading the log 420 and updated the mainline restart information 222 at a subsequent message queue commit interval. The mainline log reader 200 has now read transaction three (Tx3) and transaction four (Tx4) and committed them to queue one 412. Therefore, the mainline-log-restart point 222 remains unchanged to point to the start of transaction one 430 (arrow 431), and the mainline last queue commit point now has a timestamp associated with the end of transaction three, as indicated by arrow 432.

In the foregoing example, all transactions are sent to all queues. Alternately, filters may be used to block some transactions and changes from being sent to some queues. In another alternate embodiment, subscriptions may request that only certain types of changes be sent to a subset of the queues. For example, the changes in transaction three (Tx3) may be published only to queue two. The mainline log reader 200 continues to reconstruct transactions in the mainline buffer for the catch-up queues, but does not publish the transactions to the catch-up queues. The reconstructed transactions for the catch-up queues in the mainline buffer may be used during resynchronization because the mainline log reader 200 may have to complete the writing of a transaction that was in-flight when the catch-up log reader 210 was terminated. The term in-flight means that a database commit record for a transaction has not yet been read by a log reader, and in this example, the catch-up log reader 210.

One difference between the mainline log reader 200 and the catch-up log reader 210 is that the catch-up log reader is dedicated to a single queue, therefore, the catch-up log reader 210 attempts to publish a subset of the subscriptions. Another difference between the mainline log reader and the catch-up log reader is that all subscriptions for a catch-up log reader are for the same queue, and the catch-up log reader will continue to attempt to publish even though that queue is not available.

In one embodiment, the mainline log reader and the catch-up log reader share the same code. In another embodiment, the mainline log reader and the catch-up log reader use different code.

Re-synchronization refers to the transferring or recombining of the publishing duties of the catch-up log reader 210 back to the mainline log reader 200. A re-synchronization protocol allows the mainline log reader 200 to continue publishing to the available queues during the period when the catch-up log reader 210 is attempting to transfer its publishing duties. In the re-synchronization protocol, the catch-up log reader 210 reaches the end of the log 420 before attempting to transfer its publishing duties back to the mainline log reader 200. The protocol uses an exchange of synchronization messages between the mainline and catch-up log reader, 200 and 210, respectively, and states to drive the re-synchronization.

In one embodiment, the following data structure is used to store the Restart information in the restart queue 220:

```
struct RestartInfo {
    char commiTimestamp(16);    //last queue commit point - value of most
                                //recently read database commit timestamp
    char logrestartpoint(10);   //log restart point (log sequence number)
    char queueName(48);         //queue name-NULL if mainline log reader
};
```

In the above structure, the variable, commiTimestamp represents the last queue commit point. The variable, logrestartpoint, represents the log restart point. The variable, queueName, represents the name of the queue.

In one embodiment, the mainline and catch-up log readers exchange the following synchronization messages:

| | |
|---|---|
| CATCHUP_AT | // from catchup to mainline: reached EOL or a timestamp |
| CATCHUP_FINAL | // from mainline to catchup: go to EOL/ timestamp in log |
| CATCHUP_BEHIND_AGAIN | // from catchup to mainline: error during final phase |
| CATCHUP_STOPPED | // from catchup to mainline: terminated on severe error |
| STOP | // from mainline to catchup: stop now |

In one embodiment, the mainline log reader 200 determines which catch-up log reader sent a message from the queue name in the restart information that is passed as a parameter in the CATCHUP_AT message. The mainline log reader maintains a list of the catch-up log readers. Alternately, a process identifier (id) may be used to identify which catch-up log reader sent a message. The mainline log reader 200 can specify which catch-up log reader is to receive a message using the process id, and use inter-process communication to exchange messages with a catch-up log reader.

Re-synchronization is attempted when the catch-up log reader 210 reaches the end of the log (EOL) 420. Upon reaching the end of the log, the catch-up log reader 210 sends a CATCHUP_AT message to the mainline log reader 200. The CATCHUP_AT message contains the catch-up queue restart information and an end of log indication. In one embodiment, the following structure is used to store the catch-up queue restart information and the end of log indication:

```
struct catchupAtEOLParms
{
    qRestartInfo restartInfo;    // commit timestamp and restartLSN
    boolean isAtEOL;             // true if at EOL
};
```

The structure, catchupAtEOLParms, above contains the restart information for the catch-up queue (catch-up.RestartInfo), and an end of log indication (isAtEOL).

In one embodiment, the publishing loop is represented by the following pseudocode:

```
LOOP:
    HandleITCMessages    // read and process messages from an inter-
                         // thread or process internal message queue
                         // (e.g., a CATCHUP_AT message)
    ReadTrans:
        Read log records until a commit record is found (or other stop
            condition)
    PublishTrans:
        for each change in the transaction:
            |if subscription to the table exists
            | write change to a buffer for the queue of this subscription
            |endif
        end for
        for each participating queue write the transaction extracted from
        the log
            MQPUT (db transaction);    // db transaction (or subset of)
        end for
        if time to commit the queue(s)
            MQPUT (restart information)
            MQCMIT
            Delete list of committed transactions from memory buffer
        end if
END LOOP
```

When a catch-up log reader 210 reaches the end of the log (EOL) 420, the catch-up log reader 210 sends a CATCHUP_AT message to the mainline log reader 200 to indicate that the last database commit record was found in the log 420. By the time that the mainline log reader 200 receives the CATCHUP_AT message, the mainline log reader 200 may be either: 1) ahead of the catch-up log reader 210 in the log 420, or 2) behind or equal to the catch-up log reader 210 in the log 420. Each of these two cases will be discussed separately below.

Re-Synchronization—Mainline Log Reader Ahead of Catch-up Log Reader

Figure 9:
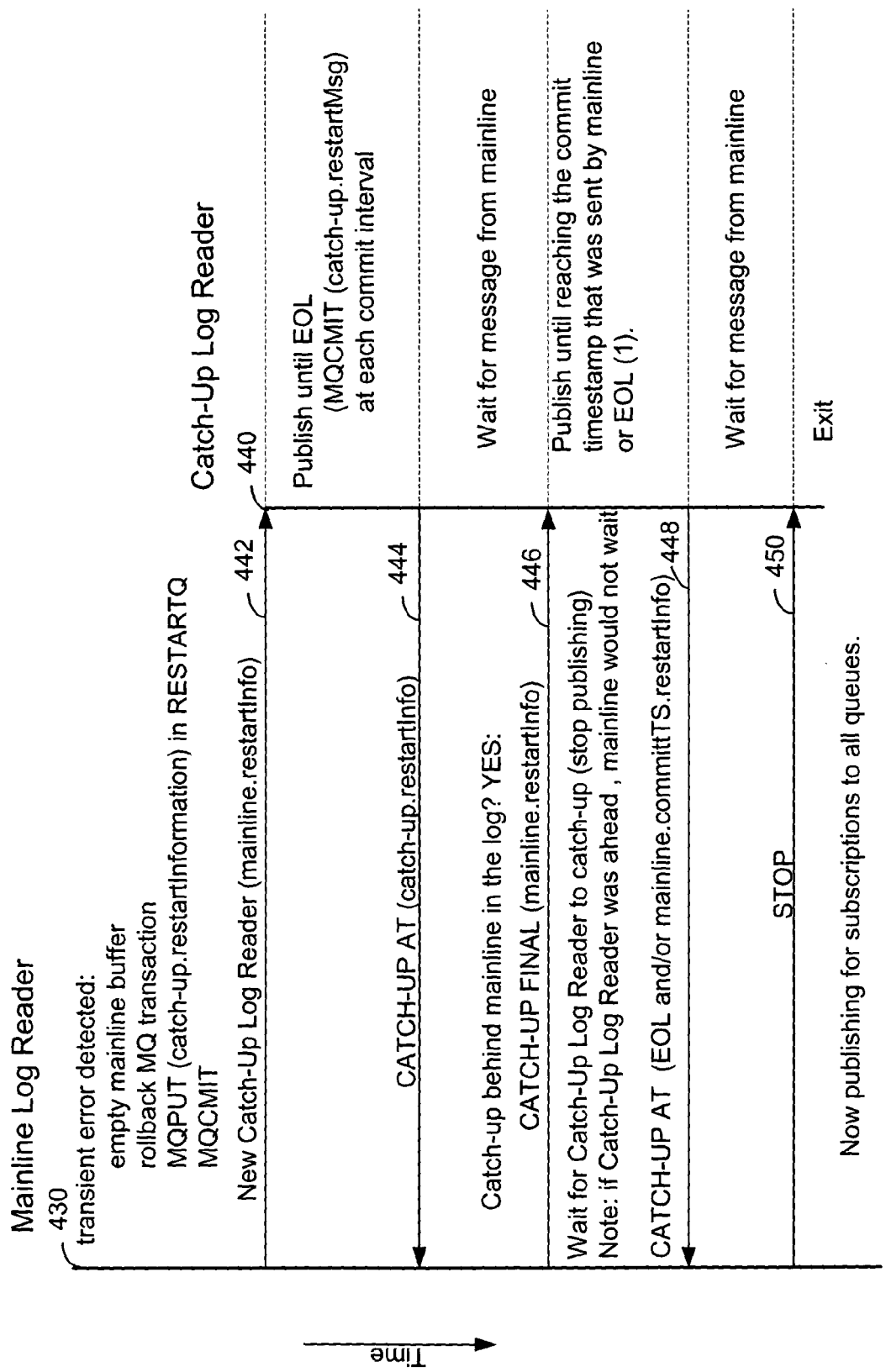
FIG. 9 depicts an exemplary time sequence diagram illustrating the launching of a catch-up log reader and the re-synchronization of the catch-up log reader with the mainline log reader when the catch-up log reader informs the mainline log reader that the formerly unavailable queue is now available and caught-up, and the mainline log reader is behind the catch-up log reader in reading the source database log.

Referring to FIG. 9, a time sequence diagram illustrates an embodiment of the message protocol when the mainline log reader is ahead of the catch-up log reader upon receiving the CATCHUP_AT message from the catch-up log reader. In this case, the mainline log reader may temporarily suspend publishing. This time sequence diagram also illustrates how a catch-up log reader is launched following the detection of a transient error.

The time sequence diagram represents the mainline log reader 200 (FIG. 3) as a first line 430, and the catch-up log reader 210 (FIG. 3) as a second line 440. In the mainline log reader 430, when a transient error is detected and a queue becomes unavailable, the mainline log reader 430, empties the mainline buffer, issues a rollback of the message queue (MQ) transaction(s), writes catch-up restart information for the soon to be launched catch-up log reader 440 to the restart queue using an MQPUT command, and performs a message queue commit command (MQCMIT) to commit the catch-up restart information to the restart queue. At this point, the catch-up restart information for the soon to be launched catch-up log reader 440 is the same as the restart information for the mainline log reader 430.

As shown by arrow 442, the mainline log reader launches the catch-up log reader 440 and passes the mainline restart information (mainline.restartInfo) to the catch-up log reader 440 using a "New catchup(mainline.restartInfo)" command. The catch-up log reader 440 attempts to publish transactions to the unavailable, that is, the catch-up queue as described above. When the catch-up queue becomes available, the catch-up log reader publishes the transactions for that queue. In addition, the catch-up log reader, at each message queue commit interval updates the catch-up last queue commit point and catch-up-log-restart point, if needed, in the catch-up restart information in the local restart queue.

When the catch-up log reader 440 reaches the end of the log, the catch-up log reader sends a CATCHUP_AT message with the catch-up log reader's catch-up restart information (catchupAtEOLParams) to the mainline log reader as indicated by arrow 444. The mainline log reader 430 receives the CATCHUP_AT message with the catch-up log reader's restart information. The mainline log reader 440 compares the last queue commit point of the catch-up log reader, a timestamp, to the last queue commit point of the mainline log reader. If the catch-up log reader's last queue commit point, a timestamp, is less than the timestamp of the mainline last queue commit point, the catch-up log reader 440 is behind the mainline log reader 430. The mainline log reader 430 then sends a CATCHUP_FINAL message with the mainline log reader's restart information to the catch-up log reader, as indicated by arrow 446. The mainline log reader 430 temporarily stops publishing and waits for the catch-up log reader 440 to catch up.

When the catch-up log reader 440 receives the CATCHUP_FINAL message with the mainline log reader's restart information, the catch-up log reader 440 publishes to its associated catch-up queue until it reaches the last-queue-commit point received in the mainline log reader's restart information or the end of the log. During the FINAL catch-up phase, the catch-up log reader 440 reads the log and publishes subscribed changes until either one of two termination events occur: (1) the end of the log is reached or (2) the commit timestamp that was sent by the mainline log reader in the CATCHUP_FINAL message is reached. The reason that the catch-up log reader uses two termination events is that the commit timestamp passed by the mainline log reader may be for a change to which the catch-up queue does not subscribe and therefore would not be detected by the catch-up log reader. Therefore, the catch-up log reader 440 may also need to continue publishing up until the end of the log.

When the catch-up log reader reaches the end of the log, the catch-up log reader 440 stops publishing, then sends a CATCHUP_AT message with the EOL indication set to true with the catch-up restart information to the mainline log reader. The mainline log reader then resumes reading the log.

When the catch-up log reader 440 publishes subscribed changes for a transaction having the same value of the commit time stamp as received from the mainline log reader 430, the catch-up log reader 440 does not read further in the log and sends a CATCHUP_AT message with the EOL indication set to false to the mainline log reader. The catch-up log reader also sends the catch-up restart information to the mainline log reader.

The catch-up log reader 440 sends a CATCHUP_AT message with the End of Log indication set appropriately, and with the catch-up restart information, as indicated by arrow 448. The mainline log reader 430 then publishes until the mainline log reader 430 reaches the time stamp sent by the catchup log reader 440. The mainline log reader 430 then sets the state of the catch-up queue to mainline and available, and deletes the catch-up restart information for the associated catch-up log reader 440 from the local restart queue. The mainline log reader 430 then sends a STOP message to the catch-up log reader to terminate the catch-up log reader 440, as indicated by arrow 450. At this point, the mainline log reader 430 is publishing subscriptions to all the queues.

In another embodiment, if a catch-up log reader receives a transient error while in the FINAL phase, that is, after receiving a CATCHUP_FINAL message, the catch-up log reader sends a CATCHUP_BEHIND_AGAIN message to the mainline log reader thread. The catch-up log reader again attempts to publish to the unavailable queue. When the mainline log reader receives the CATCHUP_BEHIND_AGAIN message from the catch-up log reader, the mainline log reader continues to publish from where it left off prior to its suspension of publishing.

In yet another embodiment, if a catch-up log reader receives a severe error for the queue, the catch-up log reader sends a CATCHUP_STOPPED message to the mainline log reader. The catch-up log reader then stops publishing and terminates. The mainline log reader continues to publish to the available queues. Alternately, the mainline log reader terminates.

Re-Synchronization: Mainline Log Reader Behind the Catch-up Log Reader

Figure 10:
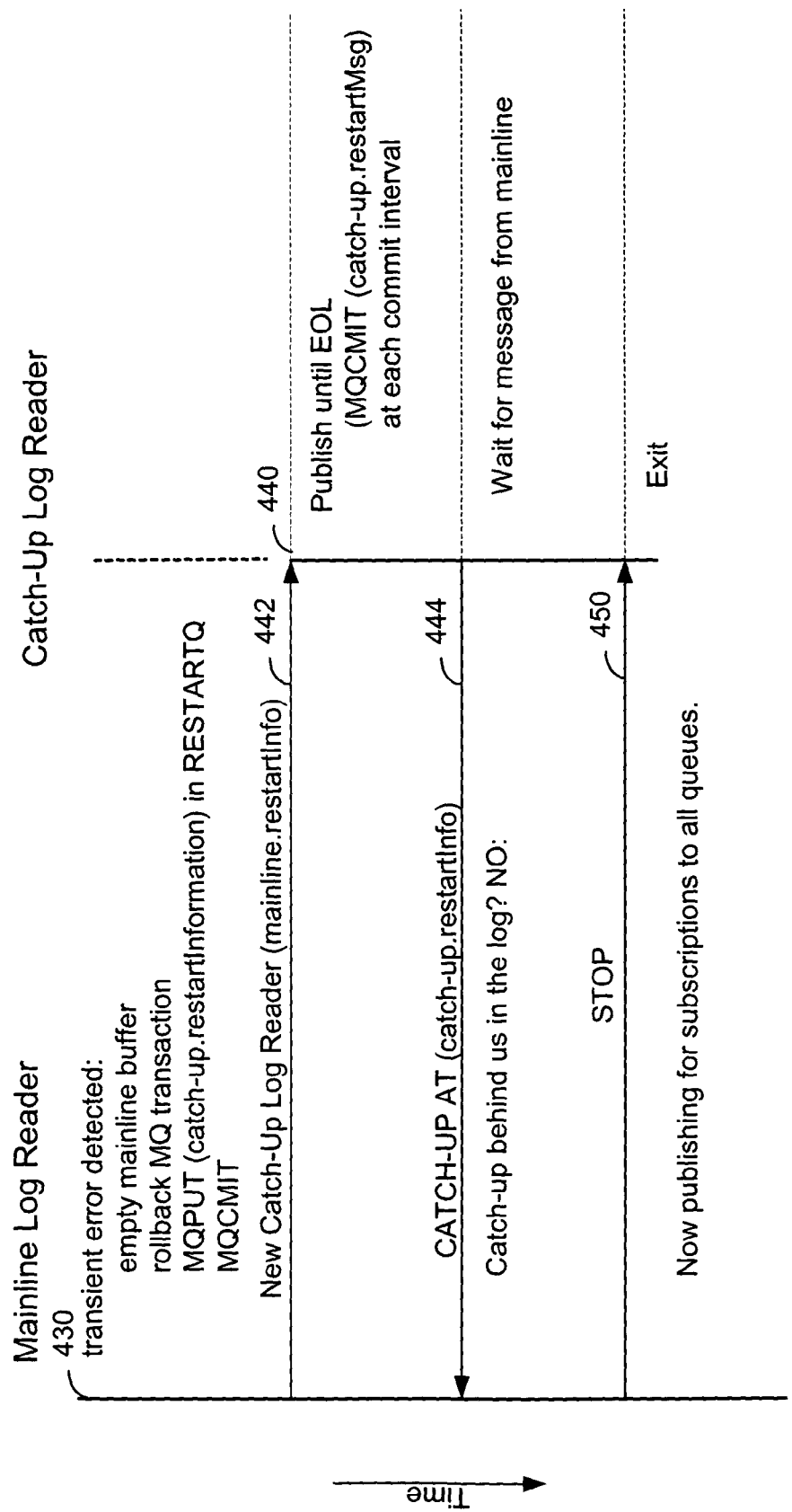
FIG. 10 depicts an exemplary time sequence diagram illustrating the launching of a catch-up log reader and the re-synchronization of the catch-up log reader with the mainline log reader when the catch-up log reader informs the mainline log reader that the formerly unavailable queue is now available and caught-up, and the mainline log reader is ahead of the catch-up log reader in reading the source database log.

FIG. 10 depicts an embodiment of a time sequence diagram for when the mainline log reader 430 is behind the catch-up log reader 440 in reading the log when the mainline log reader receives the CATCHUP_AT message from the catch-up log reader. As indicated by arrow 444, the mainline log reader launches the catch-up log reader as in FIG. 9. When the mainline log reader 430 receives the CATCHUP_AT message with the catchup restart information from the catch-up log reader 440, as indicated by arrow 442, the mainline log reader 430 determines that it is behind the catch-up log reader 440 in reading the log. To make the determination, the mainline log reader 430 compares the timestamp of the mainline last queue commit point to the last queue commit point from the catchup log reader.

The mainline log reader 430 then sends a STOP message, as indicated by arrow 450, to the catch-up log reader 440 to terminate the catch-up log reader as described above with respect to FIG. 9. The mainline log reader 430 then resumes publishing for the catch-up queue, and the other queues.

Mainline Log Reader

Figure 11A:
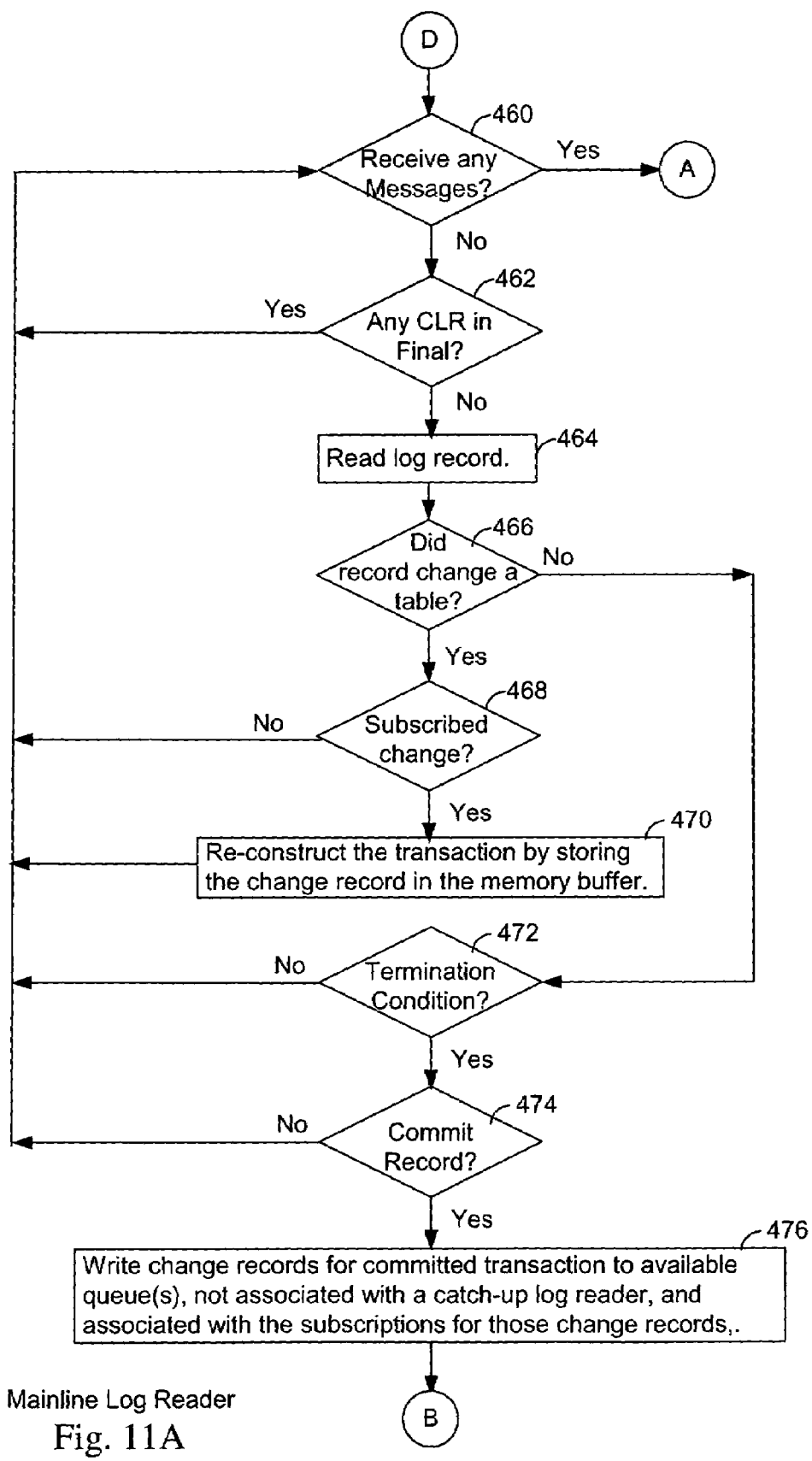
FIGS. 11A, 11B, 11C, 11D and 11E collectively depict a flowchart of an embodiment of a technique that implements a mainline log reader in accordance with the time sequence diagrams of FIGS. 9 and 10.
Figure 11B:
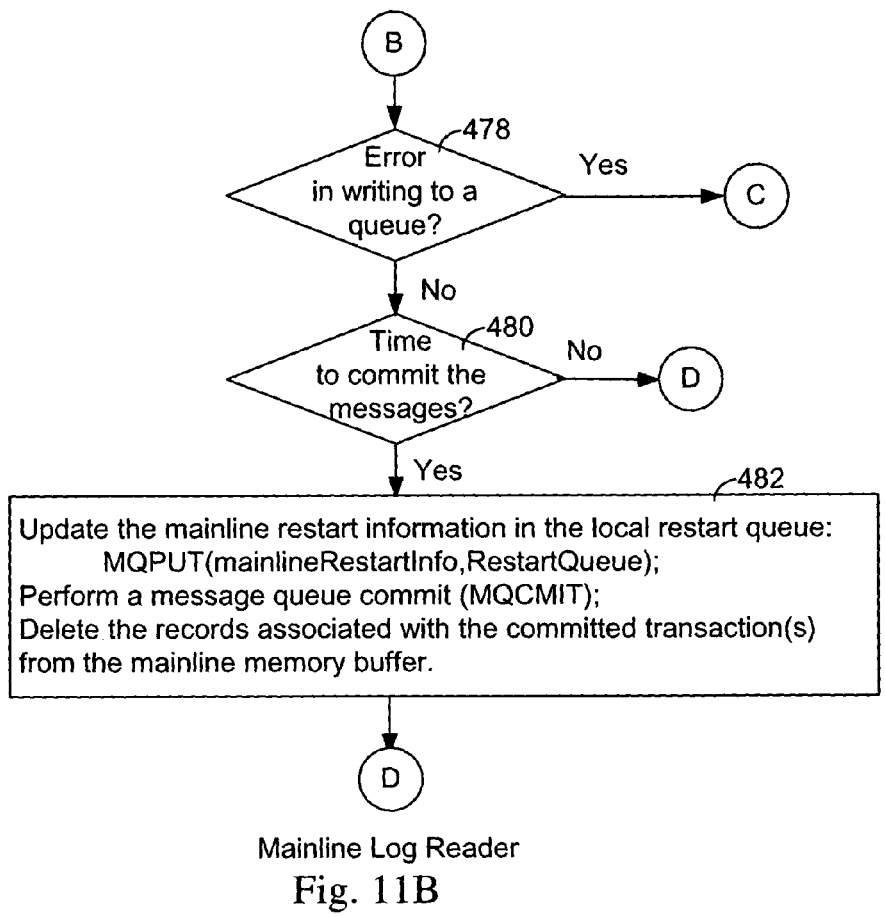
Figure 11C:
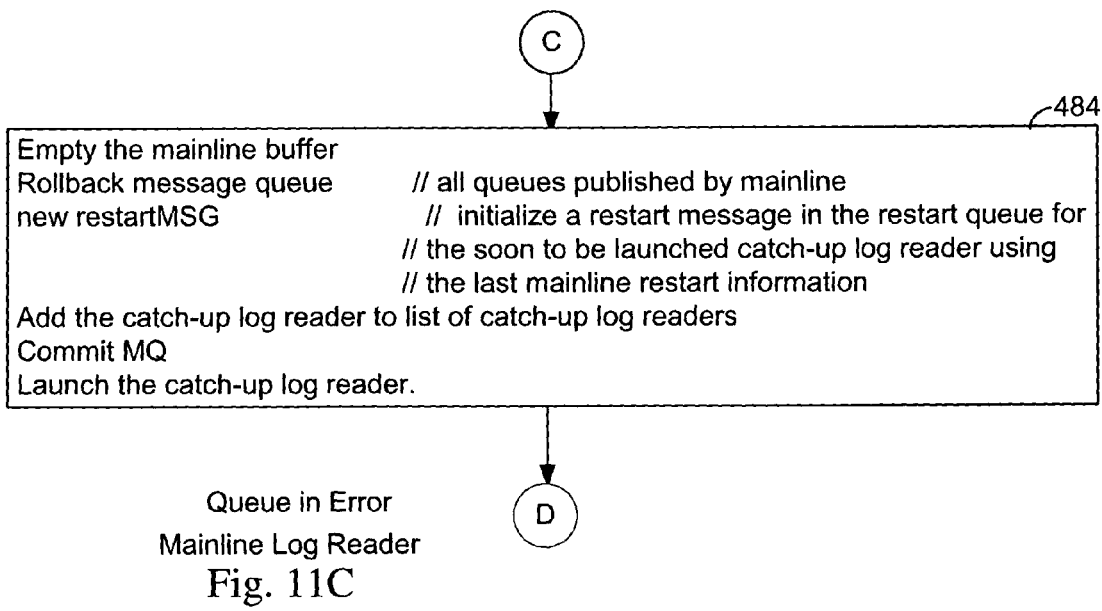
Figure 11D:
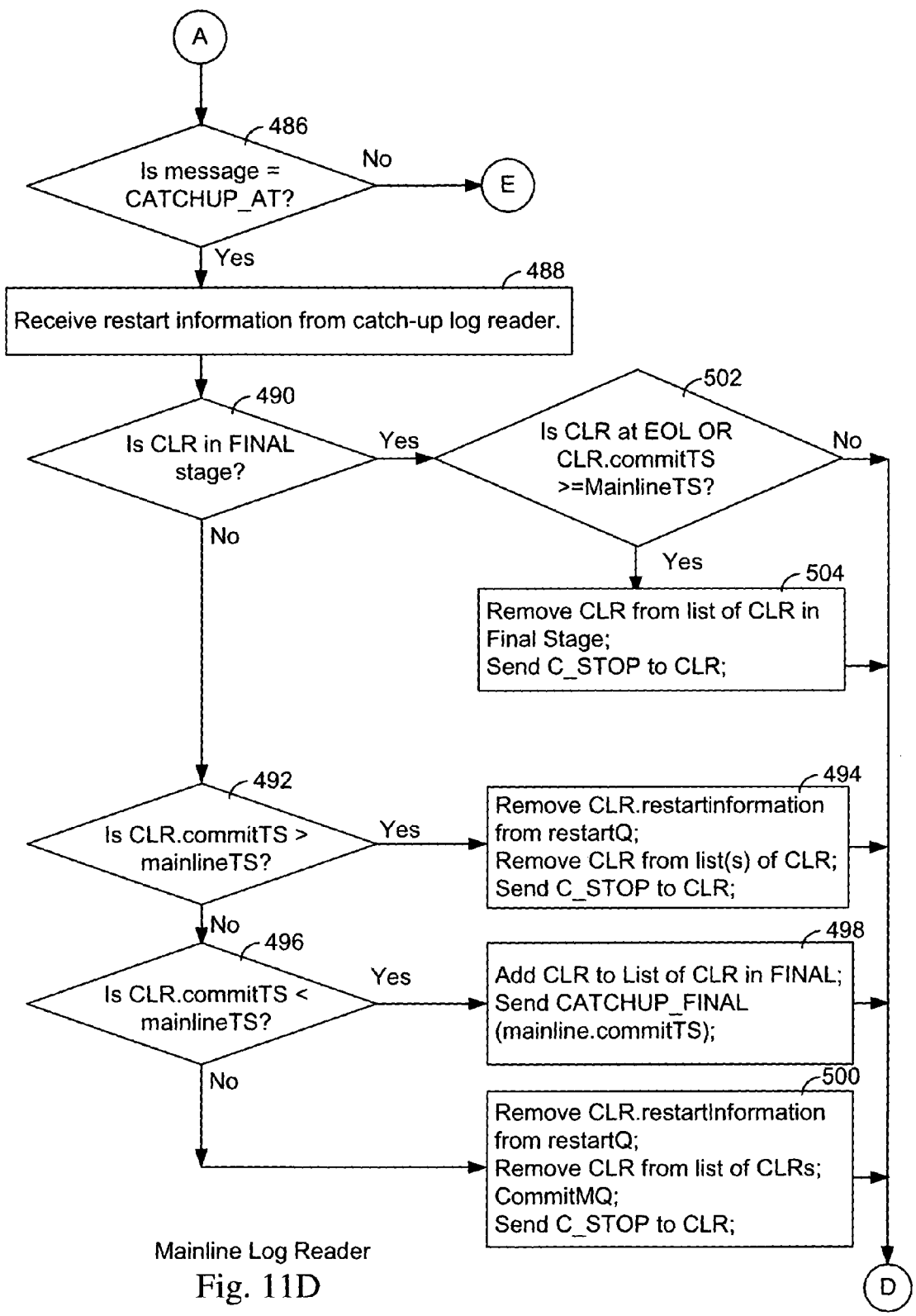
Figure 11E:
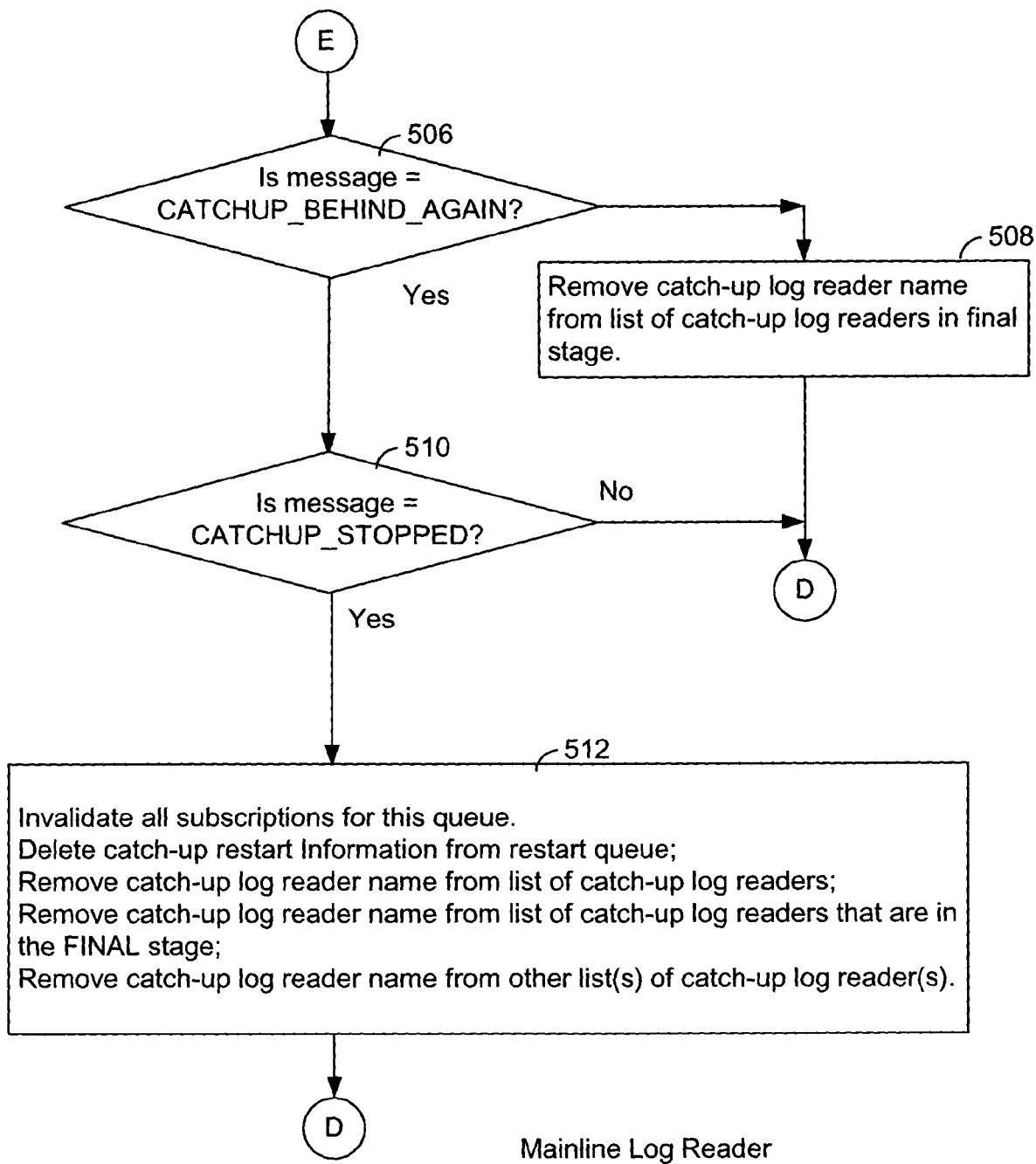

FIGS. 11A, 11B, 11C, 11D and 11E collectively depict a flowchart of a mainline log reader 200 of the computer system of FIG. 3. The flowchart has several portions. FIGS. 11A and 11B comprise a publishing loop to read and publish transactions. FIG. 11C depicts the launching of a new catch-up log reader when a queue is in error. FIGS. 11D and 11E comprise the steps taken to handle messages.

Referring to FIG. 11A, in step 460, the mainline log reader determines whether any messages were received. If so, the flowchart proceeds to FIG. 11D (Continuator A). If not, step 462 determines whether any catch-up log reader (CLR) is in the FINAL stage. To make the determination, the mainline log reader maintains at least one list 211 (FIG. 3) depending on the embodiment, including a list of catch-up log readers that are in the final stage. The mainline log reader checks the list of catch-up log readers that are in the final stage. If any catch-up log readers are in the final stage (the list is not empty), the mainline log reader is currently suspended, waiting for a catch-up log reader to complete its final stage and proceeds back to step 460 to wait for a message. If, in step 462, no catchup log reader is in the final stage, in step 464, a log record is read. The log record has a log sequence number, and may be a single change. In step 466, the mainline log reader determines whether the record changed a table. If so, in step 468, the mainline log reader determines whether the change was a subscribed change based on the subscriptions. If so, in step 470, the mainline log reader re-constructs the transaction associated with the record and writes the change record to its associated transaction in the mainline memory buffer, and proceeds back to step 460 to check for another message.

If, in step 468, the record was not a subscribed change, the mainline log reader continues to step 460 to check for another message.

If, in step 466, the record did not change a table, the mainline log reader continues to step 472. In step 472, the mainline log reader determines whether the record had a termination condition. If not, the mainline log reader proceeds back to step 460 to check for another message.

If in step 472 the record had a termination condition, in step 474, the mainline log reader determines whether the record is a commit record. If not, the mainline log reader proceeds to step 460 to check for a message. If so, in step 476, the mainline log reader writes the change records for the committed transaction, as a transaction-message, to the available queue(s) in accordance with the subscription, and not to the catch-up queues. The flowchart continues to FIG. 11B (Continuator B). In step 478, the mainline log reader determines whether there was an error in writing to a queue. If so, the mainline log reader continues to FIG. 11C (Continuator C).

In an alternate embodiment, steps 476 and 478 may be combined. For example, if a transaction is written to the queues using a series of MQPUT commands, and one of the commands fails, then an error in the writing to the queue will have been detected and the flowchart continues to FIG. 11C (Continuator C).

If step 478 determined that no error occurred, in step 480, the mainline log reader determines whether the message queue commit interval has elapsed. If not, the mainline log reader continues to step 460 of FIG. 11A (Continuator D). If so, in step 482, the mainline log reader updates the mainline restart information in the local restart queue by issuing an MQPUT(mainline.restartInfo, RestartQueue), performs a message queue commit (MQCMIT), and deletes the records associated with the committed transaction(s) from the mainline memory buffer. The mainline log reader continues to step 460 of FIG. 11A (Continuator D).

If, in step 478, mainline log reader determined that an error occurred when writing to the queue, for example, an MQPUT failed, the flowchart continues to FIG. 11C (Continuator C). In FIG. 11C, in step 484, the mainline log reader empties the mainline buffer, and rollsback the message queue(s) for all the queues being published to by the mainline log reader. The catch-up buffers and catch-up queues are not affected. The mainline log reader writes a new catch-up restart message to provide catch-up restart information for the soon to be launched catch-up log reader in the persistent local restart queue. The mainline log reader performs a message queue commit to publish the catch-up restart information. The mainline log reader adds a catch-up log reader name for the soon to be launched catch-up log reader to a list of catch-up log readers, and launches the catch-up log reader. The mainline log reader continues back to step 460 of FIG. 11A (Continuator D).

If, in step 460, the mainline log reader determines that a message was received, the flowchart continues to FIG. 11D (Continuator A). In step 486, the mainline log reader determines if the message is CATCHUP_AT. If not, the mainline log reader continues to FIG. 11E (Continuator E) to identify other messages. If, in step 486, the mainline log reader determines that the message is a CATCHUP_AT message, in step 488, the mainline log reader receives the restart information in the catchupAtEoLParms structure passed by the catch-up log reader.

In step 490, the mainline log reader determines whether a catch-up log reader (CLR) is in the final stage. In one embodiment, the mainline log reader searches the list of catch-up log readers for the name of the catch-up log reader to determine whether the catch-up log reader is in the final stage. If the catch-up log reader is not in the final stage, in step 492, the mainline log reader determines whether the value of the last queue commit timestamp sent by the catch-up log reader (CLR.commitTS) is greater than the value of the last queue commit timestamp of the mainline log reader (mainlineTS). If so, in step 494, the mainline log reader remove the catch-up log reader restart information from the restart queue, and removes the name of the catch-up log reader from all lists of catch-up log readers, and sends a STOP message to the catch-up log reader to terminate the catch-up log reader and thereby transfer the publishing of messages to the queue back to the mainline log reader and proceeds to step 460 of FIG. 11A.

If step 492 determined that the value of the last queue commit timestamp of the catch-up log reader (CLR.commitTS) is not greater than the value of the last queue commit timestamp of the mainline log reader, in step 496, the mainline log reader determines whether the value of the last queue commit timestamp of the catch-up log reader (CLR.commitTS) is less than the value of the last queue commit timestamp of the mainline log reader (mainlineTS). If so, in step 498, the mainline log reader adds the name of the catch-up log reader to a list of catch-up log readers that are in the final stage, and sends a CATCHUP_FINAL message with the mainline last message queue commit timestamp as part of the mainline restart information to the catch-up log reader. The mainline log reader then continues back to step 460 of FIG. 11A (Continuator D).

If, in step 496, the mainline log reader determines that the value of the last queue commit timestamp of the catch-up log reader (CLR.commitTS) is not less than the value of the last queue commit timestamp of the mainline log reader (mainlineTS), then the values are equal. In step 500, the mainline log reader, removes the catch-up log reader restart information for that catch-up log reader from the local restart queue, removes the name of the catch-up log reader from the list of catch-up log readers, performs a message queue commit, and sends a STOP message to the catchup log reader to terminate the catch-up log reader. The mainline log reader then continues back to step 460 of FIG. 11A (Continuator D).

In step 490, the mainline log reader determines that the catch-up log reader is in the final stage, in step 502, the mainline log reader determines whether the catch-up log reader is at the end of the log (EOL) or whether the value of the catch-up log reader last message commit time stamp is greater than or equal to the value of the last queue commit timestamp of the mainline log reader (mainlineTS). If not, the mainline log reader then continues back to step 460 of FIG. 11A (Continuator D). If so, in step 504, the mainline log reader removes the name of the catch-up log reader from the list of the catch-up log readers that are in the final stage and any other lists of catch-up log readers, and sends a STOP message to the catch-up log reader to terminate the catch-up log reader. The mainline log reader then proceeds to step 460 of FIG. 11A (Continuator D).

If, in step 486, the mainline log reader determined the message is not a CATCHUP_AT message, in FIG. 11E, in step 506, the mainline log reader determines whether the message is a CATCHUP_BEHIND_AGAIN message. If so, the catch-up log reader has received another transient error. In step 508, the mainline log reader removes the name of the catch-up log reader from the list of catch-up log readers in the final stage and proceeds to step 460 of FIG. 11A (Continuator D).

If, in step 506, the mainline log reader determined that the message is not a CATCHUP_BEHIND_AGAIN message, in step 510, the mainline log reader determined if a CATCHUP_STOPPED message has been received. If a CATCHUP_STOPPED message has not been received, the mainline log reader continues back to step 460 of FIG. 11A (Continuator D). If the mainline log reader determined that a CATCHUP_BEHIND_AGAIN message has been received, the catch-up log reader has experienced a severe error. In step 512, the mainline log reader, invalidates all subscriptions for the queue associated with the catch-up log reader that sent the message, deletes the catch-up restart information from the local restart queue for the catch-up log reader, and removes the catch-up log reader name from the list of catch-up log readers in final stage. The mainline log reader continues back to step 460 of FIG. 11A (Continuator D).

Catch-up Log Reader

Figure 12A:
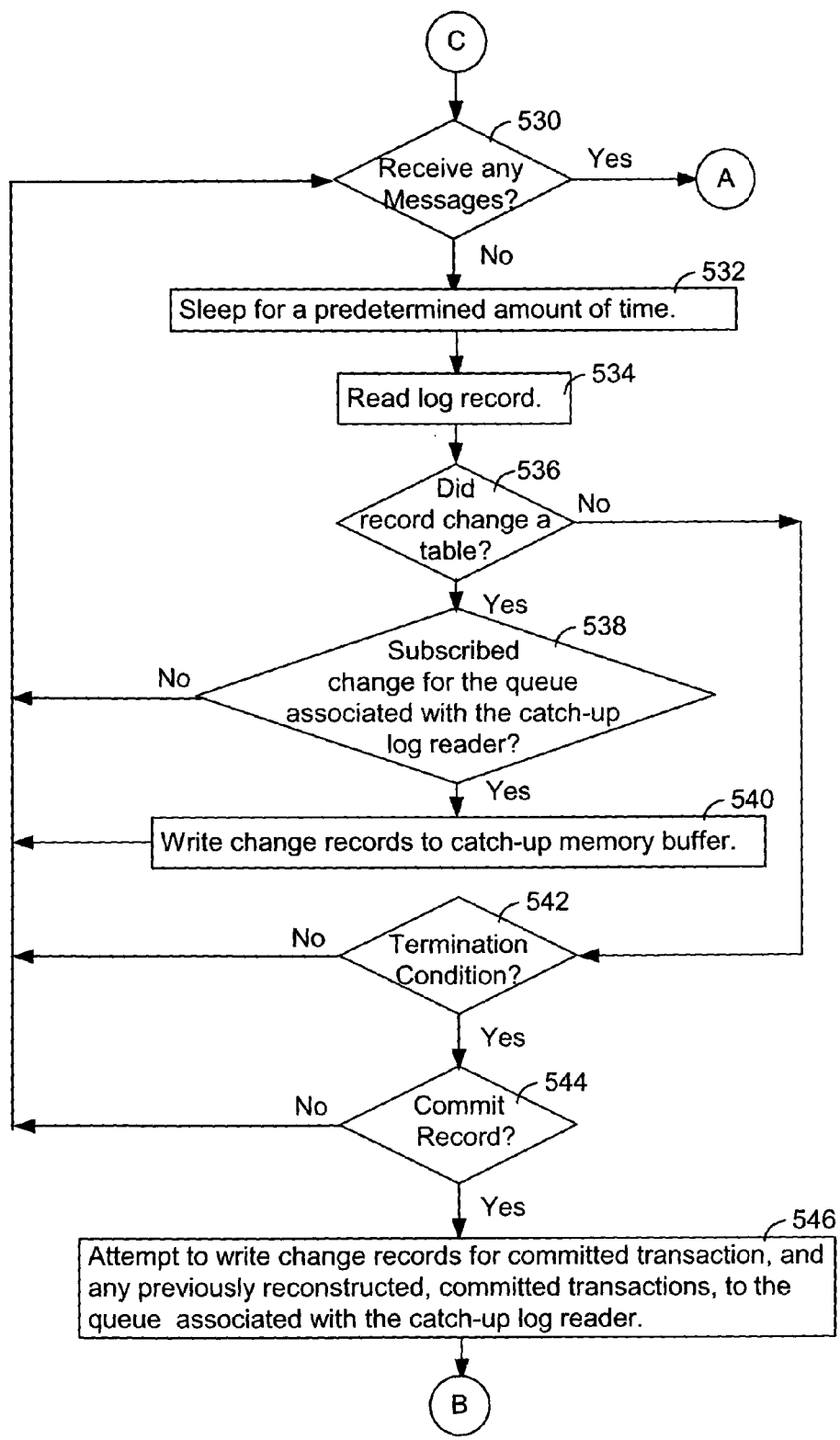
Figure 12C:
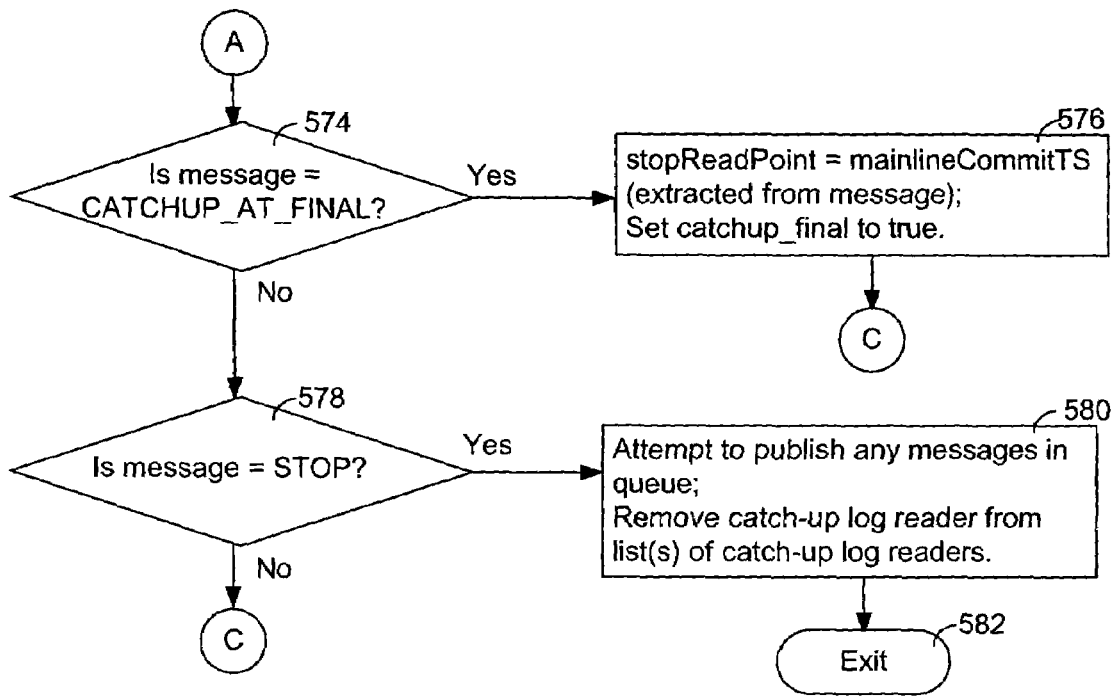

FIGS. 12A, 12B, and 12C collectively depict a flowchart of a catch-up log reader in the computer system of FIG. 3. Referring to FIG. 12A, step 530 determines whether any messages were received. If so, the catch-up log reader proceeds to FIG. 12C. (Continuator A). If not, in step 532, the catch-up log reader sleeps for a predetermined amount of time. In step 534, the catch-up log reader reads a log record from the log. Step 536 determines whether the record changed a table. If so, step 538 determines whether the change was a subscribed change based on the subscription for the queue associated with the catch-up log reader. If not, the catch-up log reader continues to step 530. If so, in step 540, the catch-up log reader writes the change record(s) to the catch-up buffer in memory to reconstruct the transaction, and proceeds to step 530.

If, in step 536, the catch-up log reader determined that a record did not change a table, in step 542, the catch-up log reader determines whether the record had a termination condition. If not, the catch-up log reader continues to step 530.

If step 542 determines that a termination condition has been received, in step 544, catch-up log reader determines whether the record is a commit record. If not, the catch-up log reader proceeds to step 530. If so, in step 546, the catch-up log reader attempts to write the change records for the committed transaction, and any previously re-constructed transactions, to the queue associated with the catch-up log reader. The flowchart continues to FIG. 12B (Continuator B).

In FIG. 12B, in step 548, the catch-up log reader determines whether there was a transient error in writing to the queue and whether the catch-up log reader is in the final stage. If so, in step 550, the catch-up log reader sets a flag, called catch_up_final, to false, and sends a CATCHUP_BEHIND_AGAIN message to the mainline log reader. The catch-up log reader then proceeds to step 530 of FIG. 12A (Continuator C).

If the catch-up log reader determines that either there was no transient error in writing to the queue or the catch-up log reader is not in the final stage, in step 552, the catch-up log reader determines whether there was a transient error. If so, the catch-up log reader proceeds to step 530 of FIG. 12A (Continuator C). If not, in step 554, the catch-up log reader determines whether a severe error occurred. If so, in step 556, the catch-up log reader sends a CATCHUP_STOPPED message to the mainline log reader. In step 558, the catch-up log reader terminates.

If, in step 554, the catch-up log reader determined that no error occurred, in step 560 the catch-up log reader determines whether it is time to commit the message(s) containing the transaction(s) to the queue, that is, whether the message queue commit interval has elapsed. If not, the catch-up log reader proceeds to step 530 of FIG. 12A (Continuator C). If so, in step 562, the catch-up log reader writes updated catch-up restart information for itself to the local restart queue, and publishes the message(s) to the queue by performing a message queue commit.

In step 564, the catch-up log reader determines whether it has reached the end of the log (EoL). If not, the catch-up log reader proceeds to step 530 of FIG. 12A (Continuator C). If so, in step 566, the catch-up log reader determines whether it is in the final stage. If so, in step 568, the catch-up log reader gets the current catch-up restart information. In step 570, the catch-up log reader determines whether the current restart commit timestamp is greater than or equal to the stop read point commit timestamp sent from the mainline log reader. If not, the catch-up log reader proceeds to step 530 of FIG. 12A (Continuator C). If so, in step 572, the catch-up log reader sends a "CATCHUP_AT" message with the current restart information to the mainline log reader, and proceeds to step 530 of FIG. 12A (Continuator C).

If, in step 566, the catch-up log reader is not in the final stage, the catch-up log reader proceeds to step 572.

If, in step 530 of FIG. 12A, the catch-up log reader determines that a message has been received. In step 574 of FIG. 12C, the catch-up log reader determines whether the message is a CATCHUP_FINAL message. If so, in step 576, the catch-up log reader sets the stop Read Point variable equal to the value of the last queue commit timestamp of the mainline log reader that was received as a parameter with the message, and sets the catchup_final flag to true. The catch-up log reader proceeds to step 530 of FIG. 12A (Continuator C).

If, in step 574, the catch-up log reader determines that CATCHUP_FINAL message has not been received, in step 578, the catch-up log reader determines wither the message is a STOP message. If not, the catch-up log reader proceeds to step 530 of FIG. 12A (Continuator C). If so, in step 580, the catch-up log reader attempts to publish any messages on the queue, and terminates (step 582).

Restart of Capture with Catch-up Log Readers

In another embodiment, the capture program 196 (FIG. 3) with the mainline and catch-up log readers is stopped and restarted. To restart, the capture program 196 (FIG. 3) launches the mainline log reader which starts the catch-up log readers. The restart queue contains one Restart Information message for each log reader. The capture program launches the mainline log reader passing its restart information. The mainline log reader launches the catch-up log readers, passing each one its restart information. The following pseudocode illustrates one embodiment of restarting the mainline and catch-up log readers:

```
Capture program restart:
    Read mainline restart message (1st message in the restart queue)
    Start mainline log reader
```

The mainline log reader then starts the catch-up log readers. In the follow pseudo-code, the term "warmstart" refers to re-starting from where the capture program was stopped using the restart information in the restart queues. The term "coldstart" refers to not using any restart information but to start reading at the end of the log, in which case, only a mainline log reader is started.

```
Capture restart:
    if (isMainline)
        If (warmstart)      / for cold' start - do not start catchups - read
                            / from EOL
            Read all catch-up log reader restart messages
            Load the subscriptions for all queues
            Loop: Start all catchup threads in a loop
                new catchup( restartInfo, restartInfo.qName);
            end Loop
    else if (isCatchup)
        // in a catch-up process that got spawned by the code above
        Load the subscription for the single queue for the catch-up log
        reader
```

Figure 13:
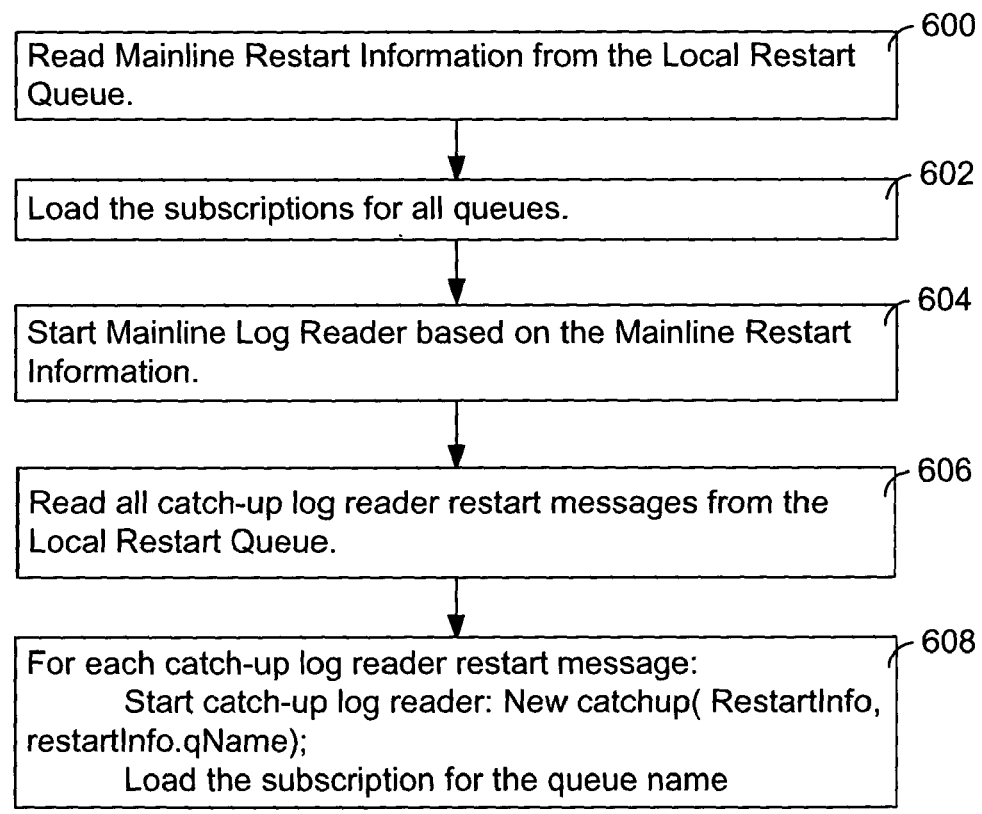
FIG. 13 depicts a flowchart of a technique to restart a mainline log reader and at least one catch-up log reader.

Referring to FIG. 13, a flowchart of restarting the restart module is shown. In step 600, the capture program reads the mainline restart information from the local restart queue. In step 602, the capture program loads the subscriptions for all the queues. In step 604, the capture program starts the mainline log reader based on the mainline restart information. In step 606, the mainline log reader reads the catch-up log reader restart messages from the local restart queue. In step 610, for each catch-up log reader restart message, the mainline log reader starts a catch-up log reader, and loads the subscription for the queue based on the queue name.

The invention has been described by way of specific embodiments, but those skilled in the art will understand that various changes in form and detail may be made without deviating from the spirit or scope of the invention.

What is claimed is:

1. A method comprising:
   publishing, by a first log reader, first messages to a plurality of queues, the first messages comprising changes for transactions extracted from a log by the first log reader;
   in response to one of the queues becoming unavailable, launching a second log reader to read and extract from the log, and to publish second messages comprising changes for transactions extracted from the log by the second log reader to the unavailable queue as a catch-up queue; and
   in response to the catch-up queue becoming available and the second log reader reaches the end of the log, transferring the publishing of the second messages for the catch-up queue from the second log reader to the first log reader,
   wherein said transferring comprises re-synchronizing the second log reader and the first log reader,
   wherein said re-synchronizing comprises:
      sending synchronization messages between the first log reader and the second log reader; a first synchronization message of the synchronization messages being sent from the second log reader to the first log reader with second log reader restart information; and in response to the second log reader being behind the first log reader in reading the log based on the second log reader restart information, a second synchronization message of the synchronization messages being sent from the first log reader to the second log reader, the second synchronization message comprising first log reader restart information having a first-last-queue-commit point timestamp, and suspending the publishing by the first log reader until the second log reader reaches the first-last-queue-commit point timestamp or the end of the log.

2. The method of claim 1 wherein the first log reader launches the second log reader.

3. The method of claim 1 further comprising: terminating the second log reader.

4. The method of claim 1 wherein the first log reader and the second log reader execute separately.

5. The method of claim 1 further comprising:
storing the first log reader restart information, associated with the first log reader, in persistent memory;
storing the second log reader restart information, associated with the second log reader, in the persistent memory;
stopping the first log reader and the second log reader,
first launching the first log reader based on the first log reader restart information; and
second launching the second log reader based on the second log reader restart information.

6. A method comprising:
publishing, by a first log reader, first messages to a plurality of queues, the first messages comprising changes for transactions extracted from a log by the first log reader;
in response to one of the queues becoming unavailable, launching a second log reader to read and extract from the log, and to publish second messages comprising changes for transactions extracted from the log by the second log reader to the unavailable queue as a catch-up queue; and
in response to the catch-up queue being available and the second log reader reaches the end of the log, transferring the publishing of the second messages for the catch-up queue from the second log reader to the first log reader, wherein said transferring comprises re-synchronizing the second log reader and the first log reader,
wherein said re-synchronizing comprises:
sending synchronization messages between the first log reader and the second log reader;
a first synchronization message of the synchronization messages being sent from the second log reader to the first log reader with second log reader restart information; and
in response to the second log reader being ahead of the first log reader in reading the log based on the second log reader restart information, a stop message of the synchronization messages being sent to the second log reader;
in response to the second log reader being behind the first log reader in reading the log based on the second log reader restart information, a second synchronization message of the synchronization messages being sent from the first log reader to the second log reader, the second synchronization message comprising first log reader restart information having a first-last-queue-commit point timestamp, and suspending the publishing by the first log reader until the second log reader reaches the first-last-queue-commit point timestamp or the end of the log.

7. The method of claim 6 wherein the first log reader launches the second log reader.

8. The method of claim 6 further comprising:
terminating the second log reader.

9. The method of claim 6 wherein the first log reader and the second log reader execute separately.

10. The method of claim 6 further comprising:
storing the first log reader restart information, associated with the first log reader, in persistent memory;
storing the second log reader restart information, associated with the second log reader, in the persistent memory;
stopping the first log reader and the second log reader,
first launching the first log reader based on the first log reader restart information; and
second launching the second log reader based on the second log reader restart information.

* * * * *